(12) United States Patent
Raman et al.

(10) Patent No.: US 8,209,396 B1
(45) Date of Patent: Jun. 26, 2012

(54) VIDEO PLAYER

(75) Inventors: Sanjay Raman, San Francisco, CA (US); Michael Murray, San Francisco, CA (US); Henry Yao, San Francisco, CA (US); Martin Oliver Pedrick, Brooklyn, NY (US)

(73) Assignee: Howcast Media, Inc., New York, NY (US)

( * ) Notice: Subject to any disclaimer, the term of this patent is extended or adjusted under 35 U.S.C. 154(b) by 278 days.

(21) Appl. No.: 12/332,239

(22) Filed: Dec. 10, 2008

(51) Int. Cl.
*G06F 15/16* (2006.01)

(52) U.S. Cl. .................... 709/217; 709/219; 709/231

(58) Field of Classification Search .................... 709/217
See application file for complete search history.

(56) References Cited

U.S. PATENT DOCUMENTS

| | | | |
|---|---|---|---|
| 6,791,579 B2 | 9/2004 | Markel | |
| 2002/0161909 A1 | 10/2002 | White | |
| 2004/0174367 A1 | 9/2004 | Liao | |
| 2005/0223034 A1 | 10/2005 | Kaneko et al. | |
| 2007/0204310 A1 | 8/2007 | Hua et al. | |
| 2008/0013916 A1* | 1/2008 | Sharpe et al. | 386/52 |
| 2008/0036917 A1* | 2/2008 | Pascarella et al. | 348/702 |
| 2008/0059989 A1* | 3/2008 | O'Connor et al. | 725/9 |
| 2008/0077952 A1* | 3/2008 | St. Jean et al. | 725/32 |
| 2008/0276272 A1 | 11/2008 | Rajaraman et al. | |
| 2009/0079750 A1 | 3/2009 | Waxman et al. | |
| 2009/0094652 A1 | 4/2009 | Al Adham et al. | |
| 2009/0300475 A1 | 12/2009 | Fink et al. | |
| 2010/0077290 A1 | 3/2010 | Pueyo | |

OTHER PUBLICATIONS

Gretchen Siegchrist, "JumpCut Free Online Video Editing Program," About.com Guide, http://desktopvideo.about.com/od/editingsoftware/p/jumpcut.htm, retrieved Jan. 24, 2011.
Rosario Conti, "How to play FLV videos from YouTube using Flash Lite 3," Adobe Developer Connection, http://www.adobe.com/devnet/devices/articles/youtube_fl3_video.html, retrieved Jan. 24, 2011.

* cited by examiner

*Primary Examiner* — Kenny Lin
*Assistant Examiner* — Sulaiman Nooristany
(74) *Attorney, Agent, or Firm* — Dean M. Munyon; Eric K. Wingrove; Meyertons, Hood, Kivlin, Kowert & Goetzel, P.C.

(57) ABSTRACT

Methods, systems, and tangible computer-readable memory media are disclosed that relate to a video player configured to play a video file. During playback, the video player, in one embodiment, is configured to access metadata relating to, but separate from, the video file to dynamically display graphical content distinct from the video file. A server system may receive, from a client computer system (e.g., of the video owner), information specifying metadata for the video file. This metadata may specify the display of overlay graphics and/or navigation graphics, the overlay of audio, etc. Additionally, the metadata may specify items needed to perform a process depicted in an instructional video; upon playing the video, the video player may provide one or more purchase links for such items. In one embodiment, a server system may edit the underlying video file—e.g., to include overlay graphics.

14 Claims, 23 Drawing Sheets

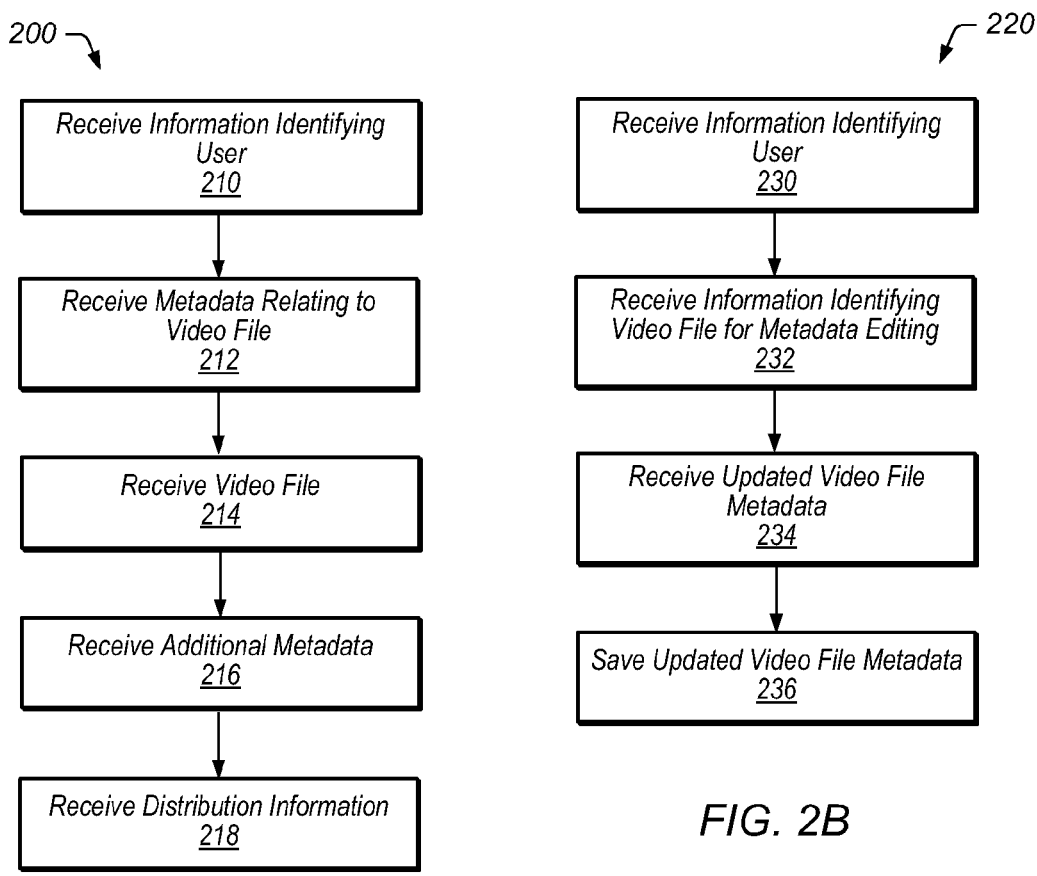

VIDEO PLAYER

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to the playback of video files on a computer system, and more particularly to the association of metadata with such video files.

SUMMARY

Various embodiments (systems, methods, and tangible computer-readable memory media) are disclosed relating to a video player configured to play a video file and, during playback, to access metadata separate from the video file to generate and dynamically display graphical content during playback of the video file. For example, an embodiment is disclosed in which a user uploads a video file and associated metadata to a server system (e.g., over the Internet). In various embodiments, the metadata is stored in a data store (e.g., database, file, etc.) separate from the video file. The data store may be located on or accessible to the server system. The server system can subsequently receive a request from a client computer system to play a video corresponding to the video file, and, in response to the request, provide information to the client computer system that causes a video player to play the video file at the client computer system and to access the associated metadata, which may, in one embodiment, include transferring metadata from the data store on the server system to one or more metadata files (which may be temporary) on the client computer system. The associated metadata may be used in various embodiments to dynamically display graphical content that is distinct from the video. For example, the associated metadata may be used by the video player to dynamically display overlay graphics and/or navigation graphics. The associated metadata for a video file may be changed (e.g. by accessing a website hosting the video file), resulting in a different dynamic display of graphic content during subsequent playback of the video file by the video player without having to re-encode the video file.

The received metadata may be usable for various other purposes, including the overlay of a different audio track, indicating video title, credits, and other graphical elements of the video. The received metadata may indicate items needed to perform a process depicted in an associated video; upon playing the video, the video player may provide one or more purchase links for these items. The purchase links may be received from, for example, a creator/owner of the video file. In another embodiment, locations associated with such links may be determined immediately prior to or during playback of the video file (i.e., dynamically). For example, a location associated with a link may be dynamically determined by accessing, at the time the link is selected, a data store at some location to determine the appropriate location to which to link.

In one embodiment, a server system stores program instructions executable to receive information indicating editing instructions for a video file (e.g., specifying the display of overlay graphics). The server system stores program instructions that are executable to alter the video file based on the received editing instructions such that subsequent playback of the altered video file incorporates the information (e.g., displaying overlay graphics and/or audio).

In one embodiment, received metadata is usable to dynamically display at least two navigation graphics during playback of the video file. These navigation graphics may be user-selectable to navigate to a corresponding point in time in the video file. In the context of an instructional video for performing a process having two or more steps, for example, a navigation graphic may be user-selectable to navigate to a portion of the video corresponding to the beginning of the depiction of one of the steps. During the process of uploading metadata about a particular video, a server system may provide information usable to display a graphical interface on a client computer system for receiving metadata indicating various user-designated points in the video file. Storing this metadata in some data store permits a video player, during playback of the video file, to access the metadata to dynamically display navigation graphics corresponding to the user-designated points in the video file. In the context of an instructional video, navigation graphics may identify a step name, a step number, an image associated with the step (which may be selected automatically or by an owner/creator of the video), etc.

In one embodiment, the video player is configured to execute at a client computer system to display navigation graphics in a sidebar display region separate from a display region for the instructional video. In certain embodiments, the sidebar display region includes control areas user-selectable to control which navigation graphics are currently displayed within the sidebar display region. In certain embodiments, the video player is configured to execute at a client computer system to display a timeline indicating a current location within the video. This timeline may be displayed, in one embodiment, in a display region separate from the display region for the video. In certain embodiments, the display region including the timeline may be separate from the sidebar display region (if applicable). The displayed timeline may include visual indicia (e.g., dots along the timeline) that correspond to various points in the video file. In certain embodiments, the visual indicia may be user-selectable to navigate to the corresponding points in the video file. In some embodiments, during a process in which currently specified metadata is edited (e.g., through a website hosting the video), a user may move one or more of the visual indicia along the timeline, thus re-designating points in the video file, causing navigation graphics (if applicable) that will be displayed during subsequent playback of the video file to be changed.

BRIEF DESCRIPTION OF THE DRAWINGS

FIG. 2A is a flowchart of one embodiment of a method relating to the uploading of a video file and associated metadata to a server system.

FIG. 2B is a flowchart of one embodiment of a method relating to the editing of metadata previously uploaded to a server system.

FIGS. 3E-F are screenshots illustrating an embodiment of web pages facilitating the editing of metadata for a previously uploaded video file.

DETAILED DESCRIPTION

Figure 1A:
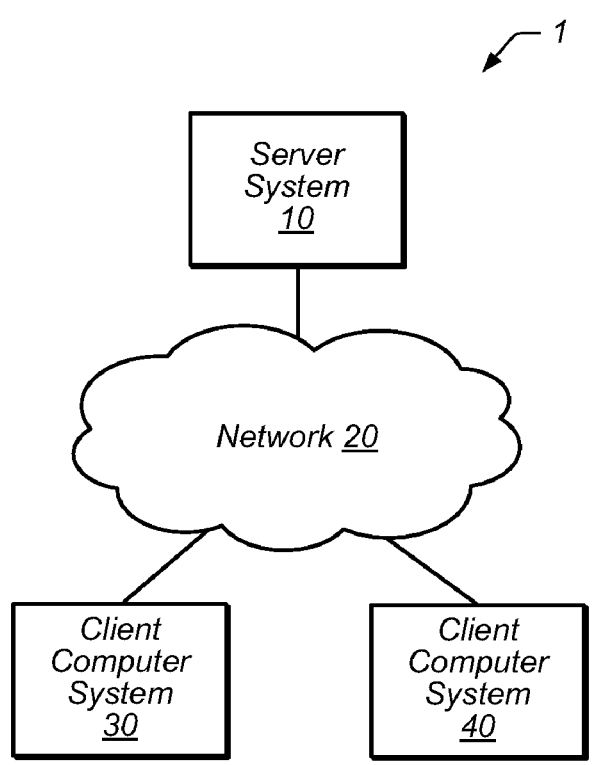
FIG. 1A is a block diagram of one embodiment of a client-server system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units. An exemplary computer system is described in more detail with reference to FIG. 1C.

"Processor unit." This term includes any circuitry that is configured to execute program instructions (e.g., a central processing unit (CPU)). As used herein, a "processor unit" may refer to a computer subsystem having one or more processors. A processor may have one or more processing "cores" on a single die. A processor unit may be distributed across multiple dies.

"Server system." This term has its ordinary and accepted meaning in the art, which includes one or more computer systems that are configured to handle requests from client computer systems—e.g., for services, data (including files, web pages, etc.), and so on.

"Client computer system." This term has its ordinary and accepted meaning in the art, which includes a computer system that requests services, data, etc. from a server system.

"Instructional video." As used herein, this term refers to a video that provides guidance to a viewer in performing some process (a "how to" video). A "process" is an extremely broad term that refers to a series of one or more events designed to achieve a particular outcome. Videos depicting how to install a solar panel and how to make conversation are both instructional videos. The term "video" may be used in this disclosure to refer to an actual video file or to the visual output that results from playing the video file via a video player.

"Video player." This term has its ordinary and accepted meaning in the art, which includes software that implements a media player for playing a video file that may reside on a volatile or non-volatile computer-readable memory medium that may, in turn, be internal (e.g., RAM, ROM) or external (e.g., CD, DVD, Blu-ray) to a computer system. A FLASH™ player, WINDOWS™ Media Player, and REAL PLAYER™ are just some examples of video players. A video player may, in some embodiments, display its output within a window of another application, such as a browser running on a client computer system.

"Video file." This term has its ordinary and accepted meaning and the art, which includes any file that that represents video. This term includes any type of FLASH™ video file format (FLV, H.264 video, HE-AAC audio), including any video embedded within SWF files. There are many examples of other video files, including, without limitation, MPEG files, QUICKTIME™ files, AVI files, files encoded on media such as DVD, Blu-ray, etc.

"Metadata." This term has its ordinary and accepted meaning in the art. As used herein, this term refers to data about a video file, including a video file corresponding to an instructional video. For example, metadata about an instructional video can include, without limitation, title, description, keywords, items needed to perform the process depicted in the instructional video, purchase links, credits (e.g., director, writer, etc.), as well as information designating particular points in time during the video (e.g., points in time corresponding to the beginning of a step in the depicted process, a fact, a tip, or a warning), etc. As described herein, in certain embodiments, metadata is stored in files distinct from the video file that it describes.

"Data Store." As used herein, this term refers to any type of file, data structure, database, or other repository in which data or metadata may be stored.

"Dynamically display." As used herein, "dynamically displaying" something such as graphical content during playback of a video file means that the graphical content changes during playback or is displayed only during a portion of the playback of the video file. Accordingly, content that does not change (or is not changeable, e.g., in response to user input) during the entirety of the playback of a video file is not dynamically displayed. Examples of content distinct from the display of the video file that may be displayed dynamically include overlay graphics and navigation graphics.

"Graphical content." As used herein, this term refers to visual content, and may include, without limitation, text, images, etc. Graphical content may have an associated audio component (e.g., an icon or other indicia associated with an audio file), but does not refer to audio-only content.

"Usable by." In the context of file X is "usable by" software Y to do Z, this phrase refers to a situation in which software Y is configured to perform function Z when executed on a computer system in response to receiving input data of a certain format, and connotes that file X has data of a certain format that software Y is configured to use/operate on to perform function Z. Thus, if a video player is configured to display overlay graphics during playback of a video file in response to a value in a metadata file indicating that such graphics are to be displayed, it can be said that the metadata file is "usable by" the video player to determine whether the graphics are to be displayed. In contrast, a file encoding only audio is not usable in this fashion.

"Purchase link." Some indicia (e.g., a hyperlink or icon) that is user-selectable to navigate to a location (e.g., a web page) where some item associated with the link can be purchased. For example, consider an instructional video for performing a process that requires duct tape and ball bearings. Purchase links for these items might include a uniform resource locator (URL) linking a web page that permits a user to purchase one or both of these items. In one embodiment, a purchase link may correspond to an executable or program instruction that facilitates the purchase of an item from some location, while in another embodiment, a purchase link may simply be a hypertext link or other type of link.

"Overlay graphic." As used herein, this term refers to graphical content (image, text, advertisement, etc.) that is displayed "on top of" the video file (overlaid) at some designated point in the video file. Consider an instructional video for performing a process having three steps that begin at 0:14 (m:ss), 1:23, and 3:00 into the video, respectively. Graphical content denoting the beginning of one of these steps and that is displayed by the video player on top of the video file (but which is not itself part of the video file) is an overlay graphic. An overlay graphic can also be used to denote a fact, tip, warning, or other text that is to be displayed during the video.

"Navigation graphic." As used herein, this term refers to graphical content that is user-selectable to navigate to some predetermined point in a corresponding video file. Consider a video player which is configured to play a video file as well as distinct graphical content that corresponds to one or more points in the video. In this example, the graphical content corresponding to each of these one or more points is a "navigation graphic" if it is user-selectable to navigate to some corresponding point in the video. Note that traditional user-selectable controls such as play, fast forward, next chapter/track, rewind, previous chapter/track, pause, skip, etc. are not navigation graphics under the above definition, as they do not have a corresponding video file and they are thus not associated with a predetermined point in such a file.

"Navigate." As used herein, this term refers to moving within a particular video file. This term is broad enough to refer to (for example) fast forwarding a video file, as well as moving to a predetermined point in a video file by selecting a navigation graphic.

"User-selectable." As used herein, this phrase refers to some aspect of a graphical interface (e.g., of a video player) that can be selected (e.g., by clicking or "mousing over", etc.) by a user via some means (a pointing device, touch screen, etc.). For example, in some embodiments, a navigation graphic may be selectable by a user to navigate to a particular point in an instructional video. In contrast, an aspect of an interface that cannot be designated by a user (e.g., a static logo, in some embodiments) is not user-selectable.

"Sidebar display region." As used herein, this phrase refers to a display region in which a video player can display graphical content. In some embodiments, this region is distinct from a display region in which a video file is displayed.

"Scrolling." This term has its ordinary and accepted meaning in the art, which includes moving through a list of items (e.g., navigation graphics) by selecting some user-selectable visual indicia (e.g., a scroll bar).

"Timeline." As used herein, a visual representation (which may be separate from a display region for displaying a video file in some embodiments) of the progress of a currently selected video file. In some embodiments, a timeline may include visual indicia corresponding to one or more points within the video file.

"Visual Indicia." Some visual representation of something else. For example, in a timeline displayed by a video player may include dots (visual indicia) representing user-designated points in time in a video file.

"Configured." As used herein, this term means that a particular piece of hardware or software is arranged to perform a particular task or tasks when operated. Thus, a computer system that is "configured to" perform task A means that the computer system includes a circuit, program instructions stored in memory, or other structure that, during operation of the computer system, performs or can be used to perform task A. (As such, a computer system can be "configured to" perform task A even if the computer system is not currently on.) Similarly, a computer program that is "configured to" perform task B includes instructions, that if executed by a computer system, perform task B.

Turning now to FIG. 1A, a block diagram of one embodiment of a client-server architecture is depicted. As shown, system 1 includes a server system 10, a network 20, and client computer systems 30 and 40. As will be described below, system 1 is one embodiment of a system for uploading and playing back video files in accordance with various embodiments described herein. For example, a user may cause a video file to be uploaded from system 30 to system 10 via network 20, along with associated metadata. Subsequently, the video file may be selected from server system 10 via network 20 for playback—for example, at any client computer system (e.g., system 40) connected to network 20.

Server system 10 is any type of computer system that can service requests from a client computer system. System 10 may include one or more computer systems in any suitable type of arrangement. System 10 may be a server farm. System 10 may store program instructions executable to service requests for electronic data via one or more predetermined protocols. For example, system 10 may be a web server accessible at a predetermined location (e.g., specified by the URL www.howcast.com), and include program instructions executable to service requests for web pages via an Internet protocol such as HTTP. As described below in the context of FIG. 1B, system 10 may store program instructions and data for facilitating the playback of video files at client computer systems. A representative structure of system 10 is described further below with reference to FIG. 1C.

Network 20 is any suitable type of connection between system 10 and client computer systems 30 and 40. Network 20 may include a local-area network, a wide-area network, or combinations thereof. Network 20 can also represent two or more disparate networks coupled together. Network 20 is the Internet in one embodiment, permitting client computer systems 30 and 40 to access locations on the World Wide Web (WWW), including, in certain embodiments, server system 10. Network 20 can be wireless or have wireless components in various embodiments.

Client computer systems 30 and 40 are any suitable type of computing device storing program instructions executable to connect to a server (e.g., system 10) over a network (e.g., network 20). For example, systems 30/40 may store program instructions that are executable to implement a browser program for displaying web pages (e.g., those hosted by system 10). As will be described below, a user of system 40 may use a browser to select one or more video files stored at system 10 (perhaps by a user of system 30) for playback at system 40. A representative structure of systems 30 and 40 is described below with reference to FIG. 1C. (Note that systems 30 and 40 need not be related to one another in any way and can be geographically disparate. Additionally, systems 30 and 40 can have different architectures.)

Figure 1B:
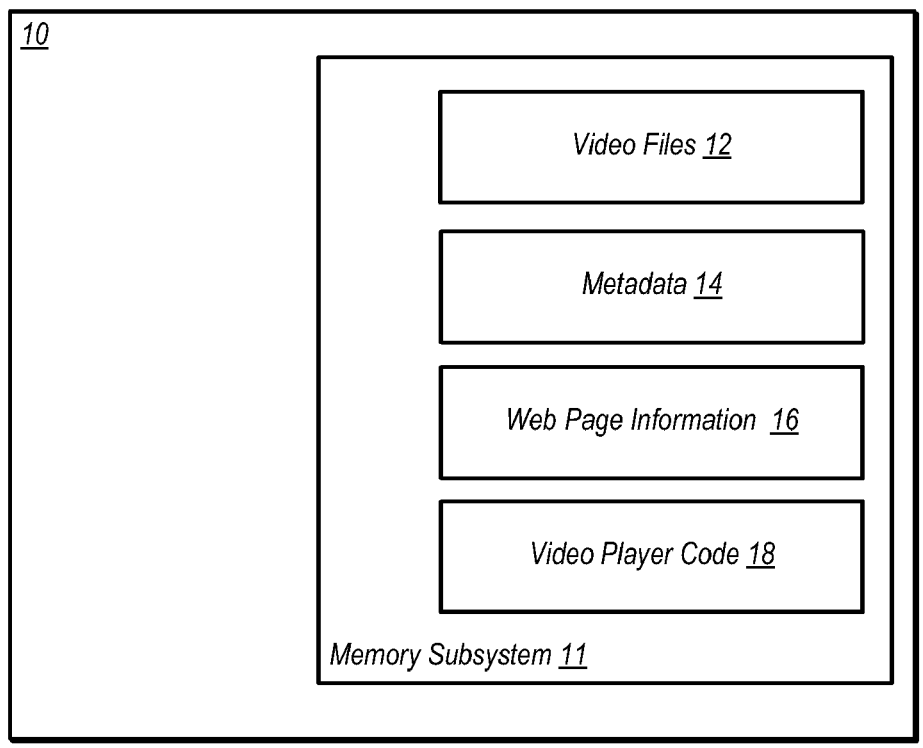
FIG. 1B is a block diagram of one embodiment of a server system.

Turning now to FIG. 1B, a block diagram of one embodiment of server system 10 is depicted. As shown, server system includes a memory subsystem 11. Other structural features of server system 10 (processors, network interfaces, etc.) are not shown in FIG. 1B for convenience.

Memory subsystem 11 is representative of any memory within or accessible to server system 10. In one embodiment, subsystem 11 stores program instructions executable by system 10 to service requests (e.g., HTTP requests). As shown, subsystem 11 stores various types of instructions and data relevant to the playback of video files in accordance with various embodiments set forth in the present disclosure. For example, subsystem 11 stores information 16 (e.g., HTML and associated instructions/code/executables) usable to display web pages on a client computer system (e.g., system 40). This information 16 may be usable not only to display web pages for uploading video files 12 and associated metadata 14 in the first instance, but also for providing an indication of videos that are accessible via server system 10.

Video files 12 may include any suitable type of video format. In one embodiment, each video is encoded using various video formats corresponding to different platforms. Thus, a given video might be encoded at a higher quality for a standard (e.g., desktop) computing platform as well as a lower quality for a mobile computing platform such as a wireless handset.

Metadata 14 can be stored in any suitable location or format. In one embodiment, metadata 14 is stored in a database that includes metadata for a plurality of video files (e.g., metadata for all video files stored by server system 10 or a subset thereof). The format of the metadata may, in one embodiment, be XML or using some other extensible language.

Accordingly, in one embodiment, a user on a first client computer system (e.g., system 30) may receive information 16 from server system 10 that is usable to display a series of one or more web pages that facilitate the upload of one or more video files 12 and associated metadata 14. This information provided to the first client computer system is stored in memory subsystem 11 of system 10 (as indicated by reference numerals 12 and 14).

Subsequently, a user on a second client computer system (e.g., system 30 or 40-system 40 is used for the remainder of the discussion of FIG. 1B) may receive information 16 from server system 10 that is usable to display a series of one or more web pages that facilitate the display and selection of video files 12 that are available via server system 10. In one embodiment, server system 10 may store information usable by system 40 to display a web page that permits users to search for videos relating to specified keywords. Upon a user of system 40 selecting a video file stored at server system 10 for playback, this selection is communicated to system 10, which causes information to be provided to system 40. The provided information includes information 16 usable by system 40 to display a web page for the video. The provided information also includes video player code 18, which is executable on system 40 to implement a video player.

In one embodiment, when video player code 18 is transferred to a client computer system (e.g., system 40), code 18 executes to implement a video player. In one embodiment, video player code 18 is executable to implement a FLASH™ player (i.e., software capable of playing back .flv files). In certain embodiments, code 18 includes program instructions executable on system 40 to begin playing the selected video file. In certain embodiments, a selected video file may be completely downloaded to system 40 before the video begins playing. In other embodiments, a selected video file may be "streamed," meaning that the video player begins playing the video file before it has finished downloading Video player code 18 can execute to delete copyrighted material from random access memory of system 40 after it is played, thus preventing system 40 from having a permanent copy of the video file. In certain embodiments, video player code 18 is also executable on client computer system 40 to access, during playback, metadata in one or more metadata files associated with the selected video file to supplement the display of the video file (the metadata may also be downloaded to system 40 in some embodiments). In this respect, such a video player differs from an embodiment in which video file metadata is read prior to playback and statically displayed during playback. As will be described below, in certain embodiments, video player code 18 is executable on client computer system 40 to access the one or more associated metadata files during playback to dynamically display graphical content during playback of the selected video file. In other embodiments, the one or more metadata files include information usable to cause audio to be overlaid during video file playback.

Figure 1C:
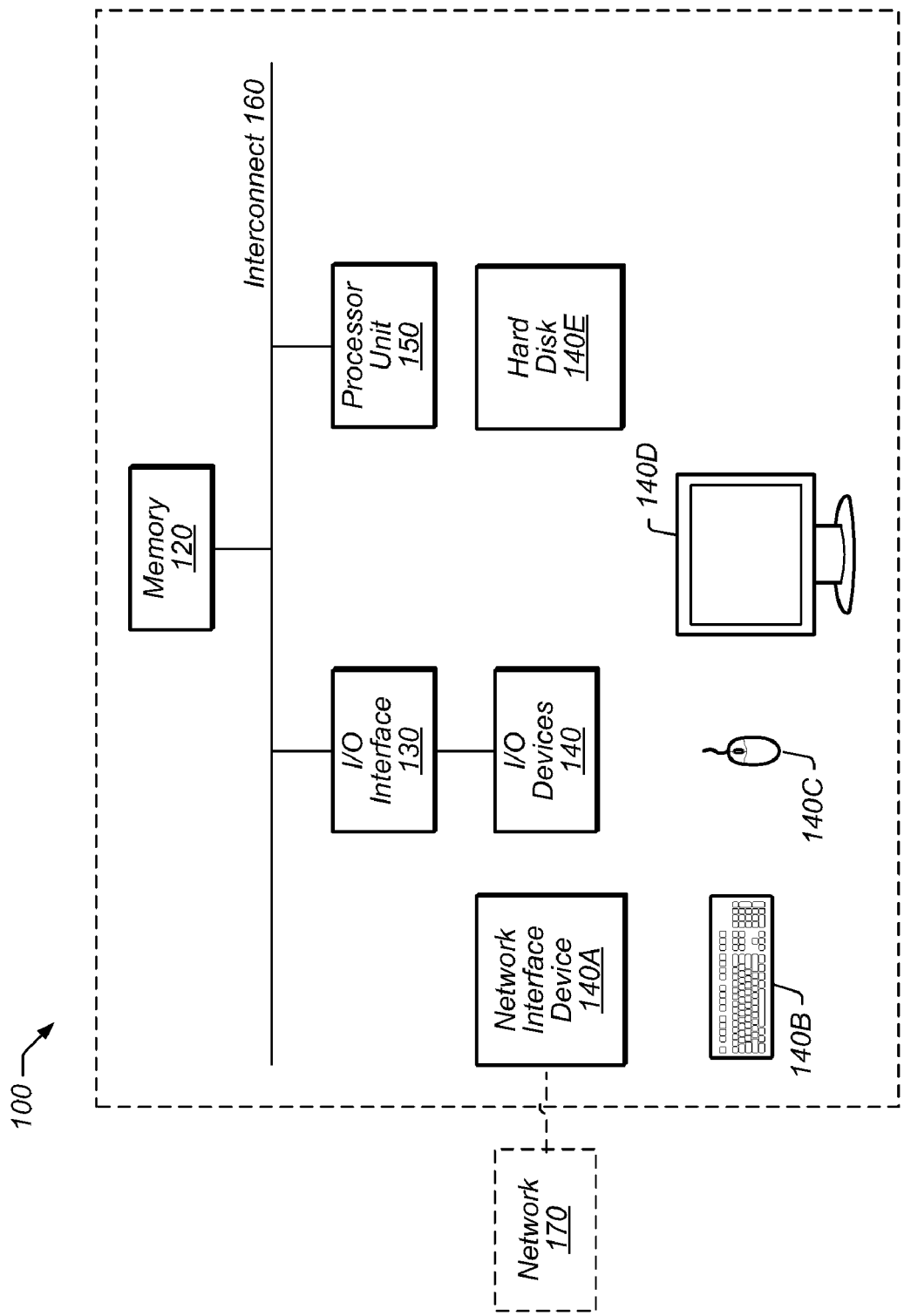
FIG. 1C is a block diagram of one embodiment of a representative computer system.

Turning now to FIG. 1C, a block diagram of one embodiment of a computer system 100 is depicted. Computer system 100 is representative of any of the computer systems described herein (e.g., server system 10, client computer systems 30 and 40), as well as any computer system or computing device that may employ the techniques described herein. Computer system 100 may be any suitable type of device, including, but not limited to, the following types of devices: a personal computer system, desktop computer, laptop or notebook computer, mainframe computer system, server farm, web server, handheld computer, workstation, network computer, a consumer device such as a mobile phone, pager, or personal data assistant (PDA). Computer system 100 may also be any type of networked peripheral device such as a storage device, switch, modem, router, etc. Although a single computer system 100 is shown in FIG. 1C for convenience, system 100 may also be implemented as two or more computer systems operating together.

As shown, computer system 100 includes a processor unit 150, memory 120, input/output (I/O) interface 130 coupled via an interconnect 160 (e.g., a system bus). I/O interface 130 is coupled to one or more I/O devices 140.

As described above, processor unit 150 includes one or more processors. In some embodiments, processor unit 150 includes one or more coprocessor units. In some embodiments, multiple instances of processor unit 150 may be coupled to interconnect 160. Processor unit 150 (or each processor within 150) may contain a cache or other form of on-board memory. In general, computer system 100 is not limited to any particular type of processor unit or processor subsystem.

Memory 120 is usable by processor unit 150 (e.g., to store instructions executable by and data used by unit 150). Memory 120 may be implemented by any suitable type of physical memory media, including hard disk storage, floppy disk storage, removable disk storage, flash memory, random access memory (RAM-SRAM, EDO RAM, SDRAM, DDR SDRAM, Rambus® RAM, etc.), ROM (PROM, EEPROM, etc.), and so on. Memory 120 may consist solely of volatile memory in one embodiment.

Memory in computer system 100 is not necessarily limited to memory 120. Rather, computer system 100 may be said to have a "memory subsystem" that includes various types/locations of memory. For example, the memory subsystem of computer system 100 may, in one embodiment, include memory 120, cache memory in processor unit 150, storage on I/O devices 140 (e.g., a hard drive, storage array, etc.), and so on. Accordingly, the phrase "memory subsystem" is representative of various types of possible memory media within computer system 100. The memory subsystem of computer 100 may store program instructions executable by processor unit 150, including program instructions executable to implement the various techniques disclosed herein.

I/O interface 130 may represent one or more interfaces and may be any of various types of interfaces configured to couple to and communicate with other devices, according to various embodiments. In one embodiment, I/O interface 130 is a bridge chip from a front-side to one or more back-side buses. I/O interface 130 may be coupled to one or more I/O devices 140 via one or more corresponding buses or other interfaces. Examples of I/O devices include storage devices (hard disk (e.g., 140E), optical drive, removable flash drive, storage array, SAN, or an associated controller), network interface devices (e.g., 140A, which may couple to a local or wide-area network), user interface devices (e.g., mouse 140B, keyboard 140C, display monitor 140D) or other devices (e.g., graphics, sound, etc.). In one embodiment, computer system 100 is coupled to a network 170 via a network interface device 140A. I/O devices 140 are not limited to the examples listed above. All depicted I/O devices 140 need not be present in all embodiments of computer system 100.

Computer system 100 (or multiple instances of computer system 100) may be used to implement the various techniques described herein. In one embodiment, one or more instances of computer system 100 can make up server system 10, storing programs and data such as video player code 18, web pages 16, video files 12, metadata 14, and one or more programs for servicing web requests for uploading video files or selecting video files for playback. Computer system 100 can also represent client computer systems 30 and 40, which, as described above, may receive and store program instructions executable to implement a video player that accesses video files 12 and associated metadata 14 stored on server system 10.

Turning now to FIG. 2A, a flowchart of a method 200 is depicted. Method 200 is one embodiment of a method for uploading a video file and associated metadata to a server system (e.g., system 10). Illustrative web pages facilitating method 200 are described below with reference to FIGS. 3A-D. Method 200 is described below as a series of actions performed by server system 10 in response to information received from client computer system 30. Corresponding client-side methods are also contemplated having similar steps (e.g., instead of "receive information identifying user" in step 210, "convey information identifying user to server system" or "input information identifying user to client computer system for conveyance to server system").

In step 210, server system 10 receives information identifying a user. Certain embodiments of method 200 may not include step 210. In one embodiment, server system 10 includes data and program instructions executable to implement a website that stores account information for users of the website. Accordingly, receipt of user-identifying information in step 210 may facilitate the retrieval of certain preferences for the identified user that may facilitate subsequent data entry. The user-identifying information in step 210 may include a user identification value (e.g., userid) and password in one embodiment. In certain embodiments, the user-identifying information may be received via a file such as a "cookie" stored on client computer system 30. In general, step 210 may be practiced by any known means of user identification, including biometrics, access token, etc. The information received in step 210 may, in some embodiments, identify a group account associated with multiple users.

In step 212, server system 10 receives metadata relating to a particular video file. The received metadata is not limited in any way, and can be any information relating to the particular video file. For example, the received metadata can include information indicating a title of the video file, short description, keywords to facilitate a search for the video, etc. A particular set of metadata for an instructional video is described further below in the context of FIGS. 3A and 3B. In one embodiment, metadata received in step 212 is stored in a database (or file or other repository, e.g., metadata 14) on or accessible to server system 10.

In step 214, server system 10 receives the video file corresponding to the metadata received in step 212. Video file may be in any suitable type of video format. Step 214 may be performed, for example, using known techniques for uploading files via a website. In various embodiments, step 214 may be performed in a different order than shown in FIG. 2A (for example, in some embodiments, step 214 may be performed prior to step 212). Alternately, step 214 can be performed concurrently with the receipt of other metadata (e.g., in step 212). A screenshot illustrating a particular implementation of step 214 is described further below in the context of FIGS. 3B and 3C.

In step 216, server system 10 receives additional metadata relating to the video file that has been uploaded. (In some embodiments, all metadata relating to the video file may be received in step 216—thus, step 212 may not be present in those embodiments.) Although step 216 is not limited in the type of metadata that may be received, this step is particularly suited for receiving metadata of a type that is facilitated by server system 10 already having a copy of the video file. As one example, the metadata received in step 216 may include metadata specifying one or more points in the video file. In such an embodiment, server system 10 can provide a web page to client computer system 30 that permits the user to playback the uploaded video file, as well as make selections during playback that "mark" one or more points in the video file. For example, step 216 might include (in one embodiment) a video player that plays the uploaded video file on client computer system 30, along with a control (button or other indicia) that a user can select at any point during playback. In one variation of such an embodiment, when a particular point in time is selected, a user can input further information about the selected point in time (e.g., a description thereof).

As will be discussed below, such an embodiment is usable in the context of an instructional video file to mark various points in the video file and supply information about those points. For example, such points might correspond to the beginning of steps in the video, as well as other points in time corresponding to facts, tips, warnings, or other information. This embodiment might also permit the inputting of further information about these points in time (e.g., text, images, etc.).

Step 216 may also include the selection of a representative image for the video file as a whole, or for various portions of the video (e.g., steps, chapters, etc.). In one embodiment, server system 10 automatically chooses default representative images, and permits a user to override these selections if desired. In another embodiment, server system 10 receives a user-specified selection of a representative image. A screenshot illustrating a particular implementation of step 216 is described further below in the context of FIG. 3D. As with step 212, metadata received in step 216 may be stored in a database (or file or other repository) on or accessible to server system 10 (e.g., metadata 14).

Note that points in a video file may be identified without playing back the video file and allowing a user to mark one or more points during playback. In one embodiment, for example, server system 10 might receive a series of values (e.g., from a file on client computer system 30) that identifies a series of points to mark during a particular video, along with corresponding descriptive information (e.g., 0:05-Step 1; 0:30-Step 2, etc.).

In step 218, server system 10 receives distribution information relating to the uploaded video file. Certain embodiments of method 200 may not include this step. Distribution information specifies information for sharing the uploaded video file. For example, distribution information may include one or more addresses (e.g., email addresses, telephone numbers, etc.). Upon receiving this distribution information, server system 10, in one embodiment, is configured to send a message (e.g., an email message, text message, etc.) to the one or more specified addresses. These messages may include a link to the video, code executable to play the video within the message itself, etc. Distribution information, in some embodiments, can specify one or more locations (e.g., websites) at which a link to the uploaded video is to be posted. Such information allows a user to link the uploaded video at a home page, a social networking site, Internet portal, any designated web page on any website, etc. A screenshot illustrating a particular implementation of step 218 is described further below in the context of FIG. 3D.

Turning now to FIG. 2B, a flowchart of a method 220 is shown. Method 220 is one embodiment of a method for editing metadata (e.g., metadata entered via method 200). As with method 200, method 220 is written from the perspective of a server system 10; a corresponding client-side method is also contemplated.

In step 230, server system 10 receives information identifying a user. Step 230 may be similar to embodiments described above for step 210 in method 200. In step 232, server system 10 receives information (e.g., from client computer system 30) identifying a video file whose metadata is to be edited. For example, in step 232, server system 10 might receive information identifying an instructional video entitled "How to Change a Flat Tire." This step allows, for example, system 10 to retrieve the currently stored metadata 14 for the indicated video file, which may be stored in a data store (database, file, etc.), which may then be conveyed to system 30 for display. Next, in step 234, server system 10 receives updated metadata (e.g., from system 30) for the video file identified in step 232. For example, if method 220 is performed subsequent to method 200, an updated version of any type of metadata received in steps 212 and 216 may be received in step 234. Finally, in step 236, the updated metadata is saved by server system 10 (e.g., updating the relevant database, file, etc.).

In embodiments in which metadata is stored on server system 10 in one or more metadata files that are separate from the associated video file, method 220 permits updated metadata to be supplied to server system 10 independent of the video file. In embodiments in which metadata is usable by a video player to dynamically display graphical content during playback of a video file, method 220 permits a different visual display of a given video file without having to re-encode and re-upload the video file.

Figure 3A:
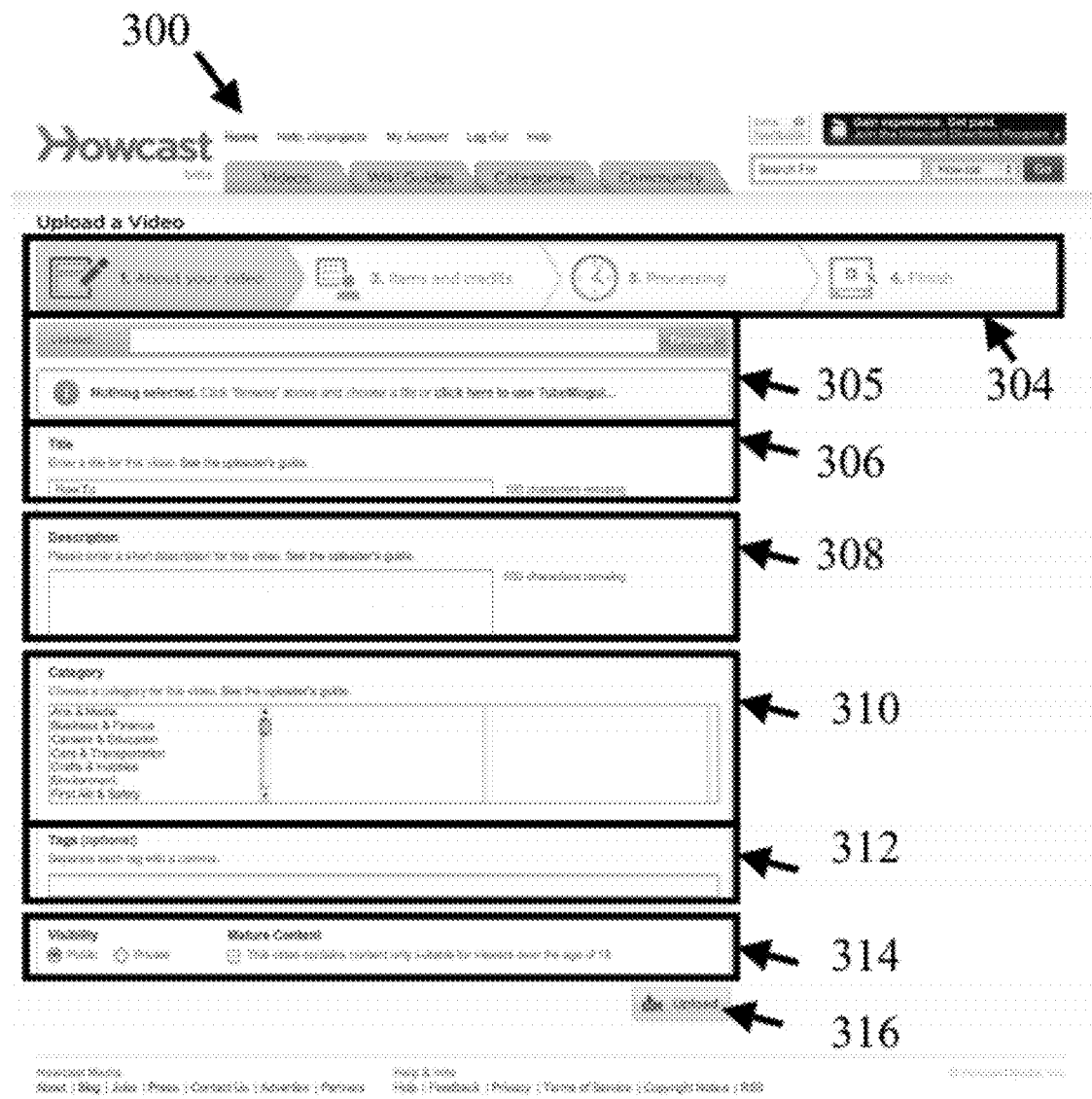
FIGS. 3A-D are screenshots illustrating embodiments of web pages for facilitating the upload of a video file and associated metadata.

Turning now to FIG. 3A, a screenshot 300 of a website implementing one embodiment of method 200 is depicted. As shown, screenshot 300 depicts a web page having a graphical user interface having a number of different portions. In this particular embodiment, screenshot 300 depicts a web page for uploading an instructional video and associated metadata. Numerous variations of the web page depicted in screenshot 300 are possible.

Portion 302 includes the text "Hello, nimprojects," illustrating that a particular user ("nimprojects") has been identified to the server system corresponding to the website (step 210). Portion 304 is a progress indicator indicating that this web page represents step one of a four-step upload process. Portions 305, 306, 308, and 310 permit a user to identify, respectively, a particular video file, a title, a description, and a category of the instructional video file to be uploaded. (Note that the title of the video file identified in portion 305 can be different from the title input in portion 306.) The category of a video file permits, in one embodiment, a user to associate the video with one of a number of pre-established categories. Similarly, portion 312 permits a user to specify tags that will aid in locating the video file via a search engine or other methods. Portion 314 allows a user to specify certain attributes of the video file, including whether the video file is public or private (i.e., available to all users or only selected users), as well as whether the video file includes mature content. Portion 316 is selectable to proceed to a second step of the upload process. Screenshot 300 thus illustrates a web page implementing one possible embodiment of step 212 of method 200.

Figure 3B:
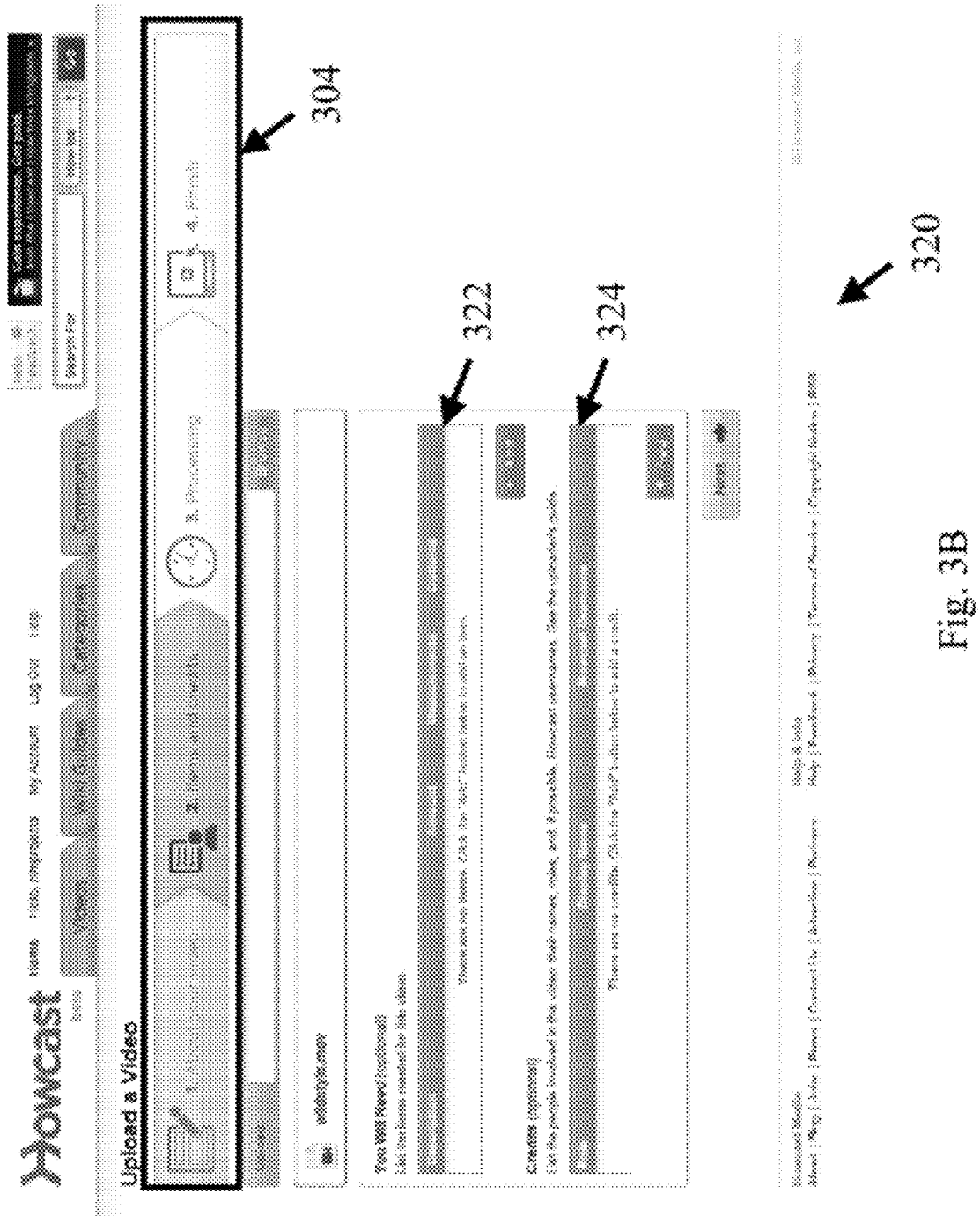

Turning now to FIG. 3B, a screenshot 320 of a web page is shown illustrating the second step of the upload process described above with reference to FIG. 3A (see portion 304 of the displayed graphical user interface, in which "2. Items and Credits" is highlighted). This web page indicates that the instructional video file has been identified ("wildstyle.mov"). Additionally, portion 322 permits a user to input a list of items that are needed for performing the process depicted in this instructional video. In certain embodiments, the user can also input additional information such as the amount of the item that is needed, measurements of the item, whether the item is optional, etc. For example, in a cooking instructional video, the "You Will Need" input portion 322 allows a user to input a list of ingredients. Although not depicted in FIG. 3B, in one embodiment, portion 322 allows a user to specify a location (e.g., a uniform resource locator or URL) for purchasing a particular item. This information is usable to display a purchase link during playback of the video file. In portion 324, a user can specify credits for the video (e.g., director, writer, etc.). The "Next" button is selectable to proceed to a third step of the upload process.

Figure 3C:
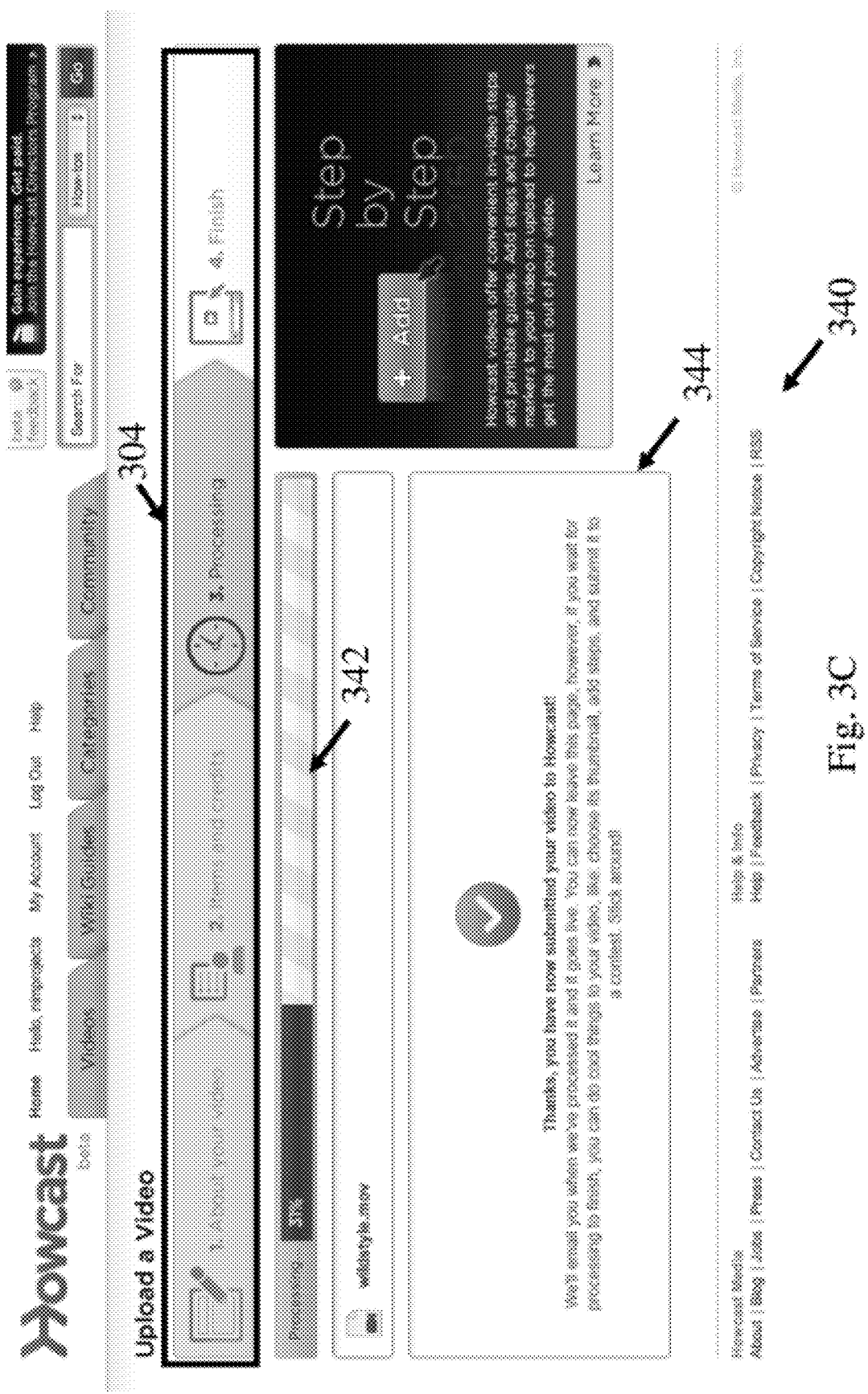

Turning now to FIG. 3C, a screenshot 340 of a web page is shown illustrating the third step of the upload process described above with reference to FIGS. 3A and 3B (see portion 304 of the displayed graphical user interface, in which "3. Processing" is highlighted). This web page indicates (via progress indicator 342) the progress of the upload for the video file ("wildstyle.mov"). Message 344 indicates to the user that metadata can continue to be entered while the video file is uploading. Screenshot 340 thus illustrates one possible embodiment of step 214 of method 200.

In one embodiment, once a video file is uploaded, it gets converted to a FLASH™ (.flv) file, as well as additional formats for mobile handsets, podcasts, etc.

Figure 3D:
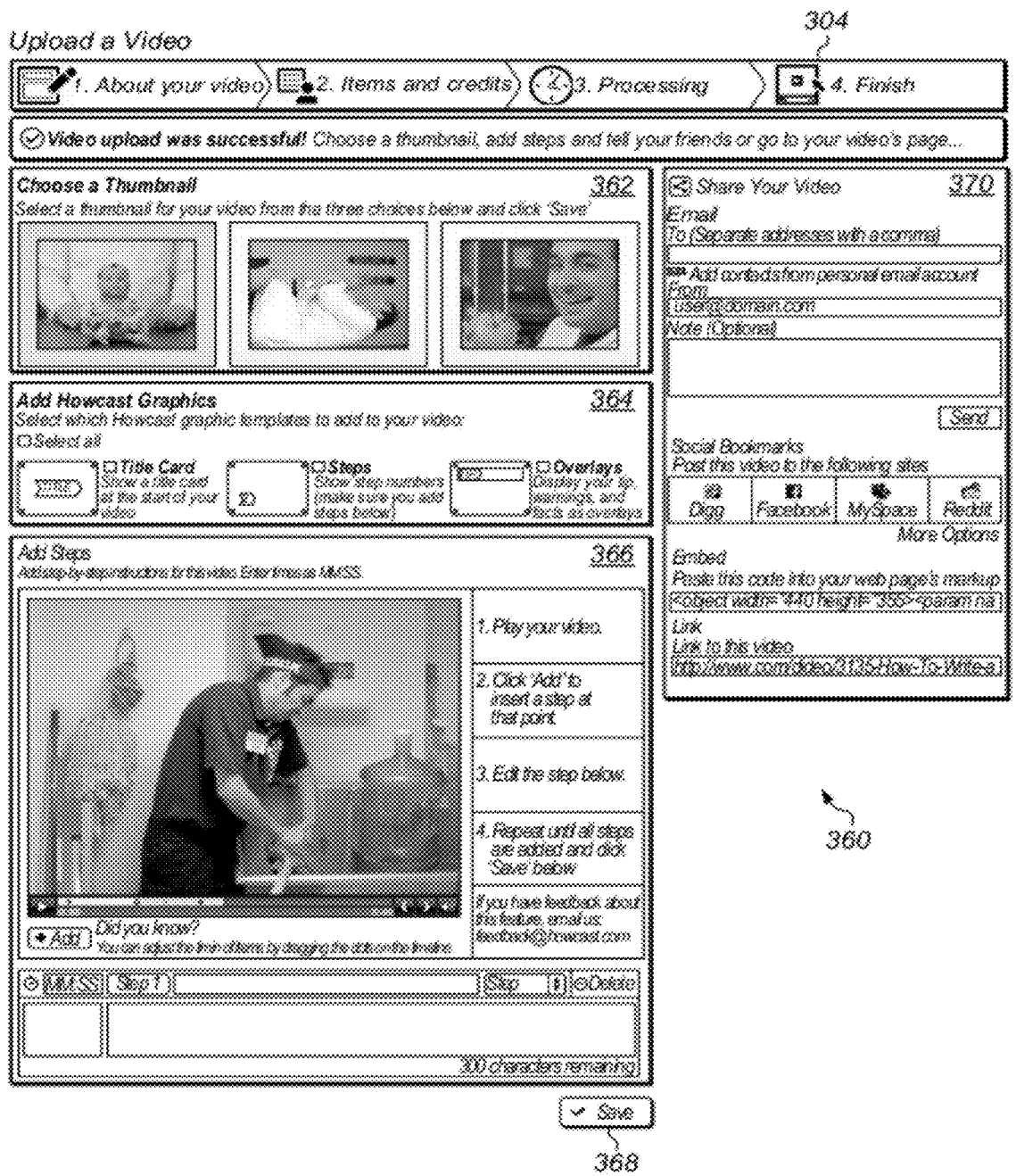

Turning now to FIG. 3D, a screenshot 360 of a web page is shown illustrating the fourth step of the upload process described above with reference to FIGS. 3A-C (see portion 304 of the displayed graphical user interface, in which "4. Finish" is highlighted). As shown, this web page indicates that the video upload has successfully completed. This web page allows the receipt of additional metadata and distribution information, and thus represents one embodiment of steps 216 and 218 of method 200.

Portion 362 of the depicted web page allows a user to select an image (a "thumbnail") to represent the video (e.g., when the video is displayed in a catalog of the web site or in search result sets served in response to specific user search queries). In one embodiment, the website serving the depicted web page analyzes the uploaded video file and presents a number of possible thumbnails. In FIG. 3D, three possible thumbnails are shown, taken from a predetermined position from the beginning of the video, a predetermined position in the middle of the video, and a predetermined position from the end of the video. Portion 362 allows a user to select one of these three thumbnails. In one embodiment, a user many select an alternate thumbnail image from a different portion of the video or supply a thumbnail from a separate file (e.g., on client computer system 30).

Portion 364 of the depicted web page allows a user to specify what type of overlay graphics (title card, step delineation, and overlays for facts, tips, and warnings, etc.) are to be added to the video by the video player during playback. Overlay graphics are discussed further below with reference to FIGS. 6A-6D. As shown, a user can select one or more of the available overlay graphics. In this embodiment, default overlay graphics are used for the selected features in portion 364 (e.g., a "chevron" is displayed for step delineation, as illustrated in FIG. 6B).

In some embodiments (not pictured in FIG. 3D), a user can specify custom overlay graphics. In such embodiments, portion 364 allows the user to upload or otherwise specify graphical content to this end. Thus, for step delineation, a user might choose to specify a custom graphic (e.g., a circle) to be used instead of the default graphic.

Portion 366 of the depicted web page allows a user to specify information that indicates one or more steps within the video. In this embodiment, a user may playback the uploaded video, selecting the "+Add" button at a point in time during the video that corresponds to a step or other textual information. When the "+Add" button is selected, the video pauses, allowing the user to add information describing that point in time (e.g., as a step, fact, etc.). Selection of the "+Add" button in this embodiment also displays the corresponding time during the video (in the field marked (MM: SS), which can also be adjusted to change the time value corresponding to the designated point in time. As noted on the depicted web page, the timing of a particular point in time can be subsequently adjusted by dragging the dots shown within the timeline underneath the display region corresponding to the video file. This process may be repeated for each point in time within the video file that the user desires to mark. As will be shown below, this information, stored within the one or more metadata files for the uploaded video file, permits the video player to dynamically display navigation graphics during playback of the video file.

After all desired information is entered, button 368 (labeled "Save") is selectable to save the provided information. As has been mentioned above, in various embodiments, the metadata for a particular video file may be saved in a data store such as a database (e.g., along with the metadata for various other video files), a file associated with the video file, or other repository.

Portion 370 allows a user to share the uploaded video by supplying distribution information. As shown, a user can supply one or more email addresses. Upon supplying this information and selecting the "Send" button, the video or a link thereto is sent to the specified addresses. Additionally, code (e.g., HTML code) can be posted to one or more specified websites, causing the video to be served from a hosting server and thus embedded in those websites.

In addition to the manual text entry techniques for metadata described above with reference to FIGS. 3A-D, other techniques are also contemplated. For example, in one embodiment, speech recognition of the audio track might be used to identify where a step in an instructional video begins (e.g., by determining when the word "step" occurs).

In another embodiment, server system 10 may receive metadata from a wiki that is written in a predetermined format recognized by software on system 10. (The term "wiki" has its understood and accepted meaning in the art, which includes a website that allows multiple users to create, modify and organize web page content in a collaborative manner.) A user of such a wiki can initiate a request to upload a corresponding video file to server system 10, allowing system 10 to store some or all of the metadata from the wiki in a metadata data store (e.g., metadata 14). Such a process allows a first user to create a wiki (e.g., a wiki hosted by system 10) and a second user to create a "how-to" video that supplements the wiki. In such an instance, the second user can then upload the video to system 10 in a manner that facilitates the expeditious entry of metadata for the video file.

Figure 3E:
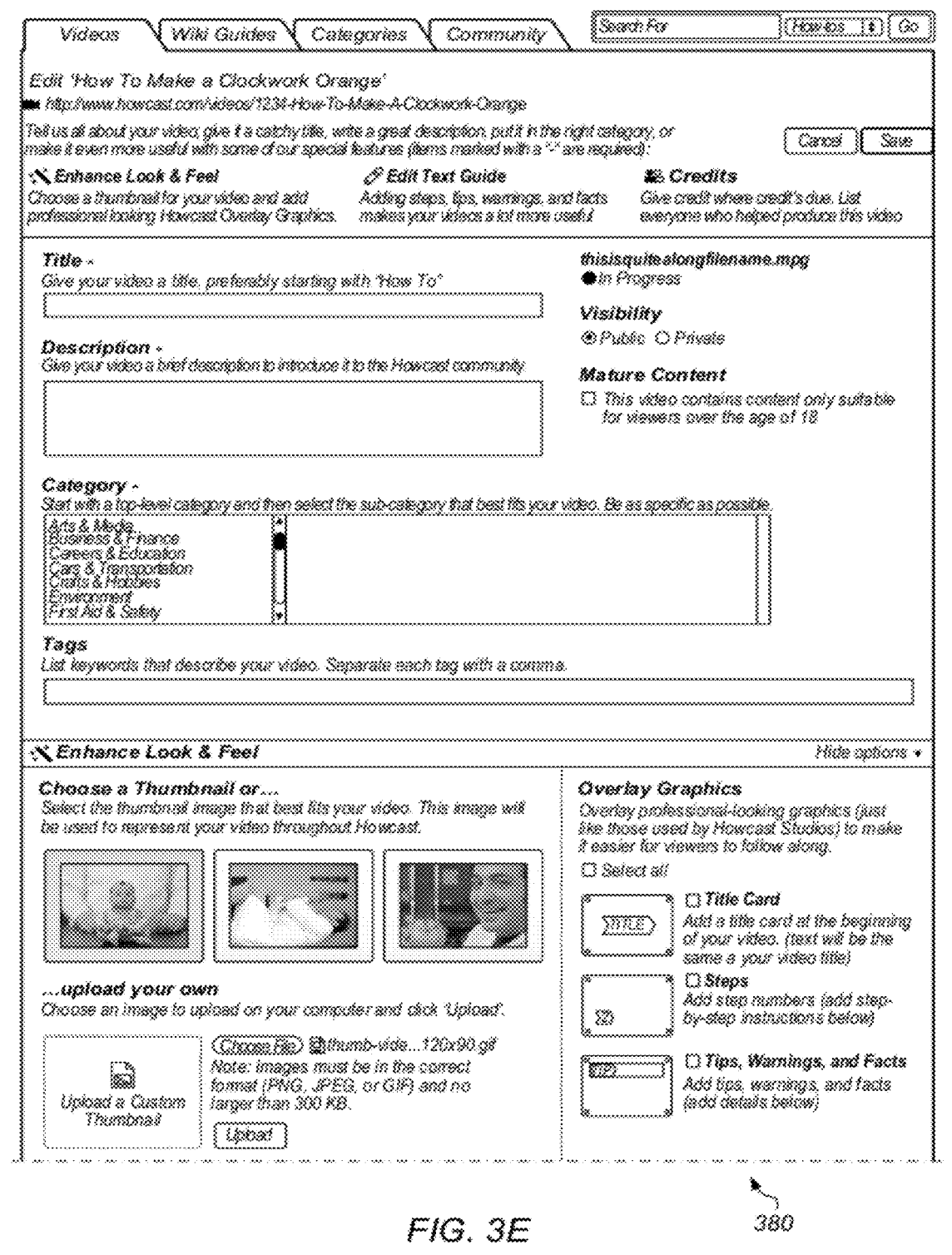
Figure 3F:
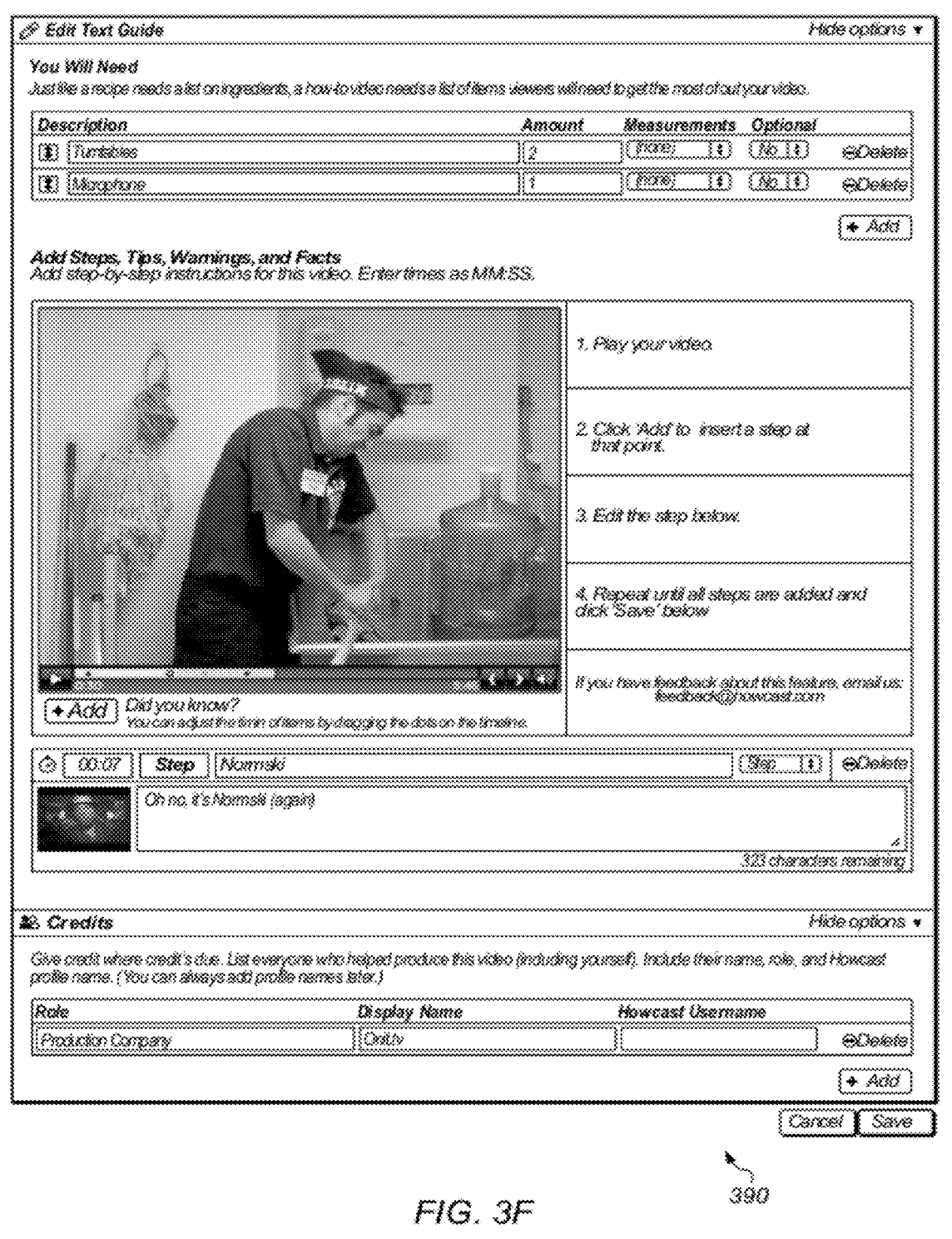

Turning now to FIGS. 3E and 3F, screenshots 380 and 390 are shown of a web page facilitating the editing of metadata for a previously uploaded video file. (FIGS. 3E and 3F are two halves of a single web page that are accessed through an "Edit" button that is shown to a user if the user is the "owner" of a particular video.) The embodiments shown in FIGS. 3E and 3F allow the editing of the data entered through the interfaces shown above in reference to FIGS. 3A-3D. As has been described, because metadata entered in FIGS. 3A-D is stored in one or more metadata files distinct from the corresponding video file in various embodiments, this metadata may be updated without having to re-encode and re-upload the video file each time changes to the metadata are made.

Figure 4:
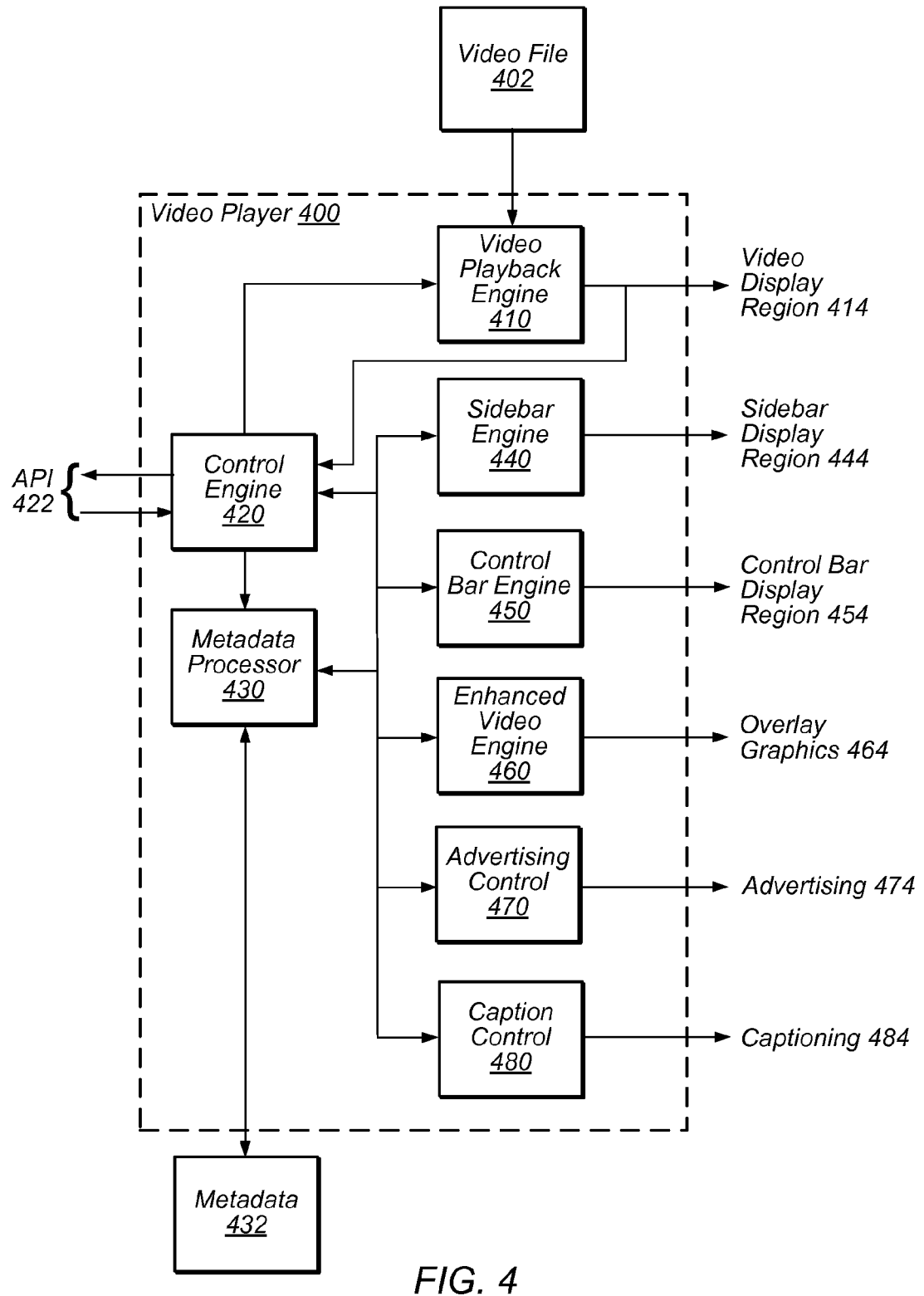
FIG. 4 is a block diagram of a video player.

Turning now to FIG. 4, a block diagram of a video player 400 is depicted. Video player 400 is one embodiment of a video player program corresponding to video player code 18 described above. Numerous other embodiments of a video player are also possible according to the present disclosure. As shown, video player 400 includes video playback engine 410, control engine 420, metadata processor 430, sidebar engine 440, control bar engine 450, enhanced video engine 460, advertising control 470, and captioning control 480. Each of these blocks corresponds to functionality that may be implemented by one or more modules in various embodiments.

Video playback engine 410 in one embodiment is code that is configured to access a given video file (represented by video file 402 in FIG. 4) for playback. Engine 410 may be a FLASH™ player in one embodiment. In one particular implementation, engine 410 outputs the video to video display region 414 (a particular region of the output of video player 400, one embodiment of which is illustrated below with reference to FIG. 5) in one operating mode. In some embodiments, video player 400 operates in a mode in which it can be controlled via an application programming interface (API) 422. This allows third-party software, for example, to use video player engine 410 (as well as other functionality of player 400) by making accesses via API 422. In such a mode, video player engine 410 directs its output to the third-party software via control engine 420 and API 422 (illustrated by the line connecting the output of video playback engine 410 to control engine 420). In some embodiments, engine 410 is configured to playback numerous types of video files. Video playback engine 410 can be controlled, for example, by control bar engine 450—for example, in response to user input pausing or playing video file 402. (Such control may be via control engine 420 in certain embodiments.)

Control engine 420 in one embodiment is code within video player 400 that coordinates the functionality of the various other modules depicted in FIG. 4. For example, control engine 420 may invoke the various modules/engines that make up the interface for player 400 and control interaction between modules (e.g., between video playback engine 410 and metadata processor 430). Additionally, in some embodiments, control engine 410 determines the current mode of the player (e.g., standard control or API-based control), etc.

Metadata processor 430 in one embodiment is code within video player 400 that accesses metadata (represented by metadata 432 depicted in FIG. 4) that has been associated with video file 402 being played back. In one embodiment, metadata 432 is a data store (database, file, or other repository) on server system 10 (e.g., metadata 14) in which the metadata for file 402 was originally saved. In one embodiment, metadata 432 is a database, file, or other repository on a client computer system (e.g., system 40). For example, metadata 432 could be a temporary file (e.g., in XML or other extensible language) that is dynamically created by metadata processor 430 by transferring data stored on server system 10 (e.g., metadata 14) to a client computer system (e.g., system 40). Metadata 432 is thus representative of metadata for video file 402 wherever the metadata is stored.

As has been described above, the metadata for a particular video may include a wide variety of information, including various time markings within the video, whether overlay graphics are to be used, etc. Metadata processor 430 accesses the metadata during operation of video player 400 (as mentioned above, in one embodiment, processor 430 controls the download, streaming, etc. of metadata 432 (which may include copyright protection), e.g., to client computer system 40 that has selected video file 402 for playback) and provides this information to various modules within player 400 as needed. For example, metadata processor 430 may access information about time markings within metadata 432 to generate navigation graphics for a particular video. These navigation graphics may be stored in random access memory, where they are available to sidebar engine 440 to be displayed as needed. (In some embodiments, sidebar engine 440 may actually generate the navigation graphics rather than processor 430.)

Sidebar engine 440 in one embodiment is code within video player 400 that controls the operation of sidebar display region 444, which is a display region output by player 400 (this region may be distinct from video display region 414 in one embodiment). As will be shown below with reference to FIG. 5, sidebar display region 444 may be toggled to be visible or not at any given point in time.

In one embodiment relating to instructional videos, sidebar display region 444 includes three types of content: items needed for a process depicted in the instructional video, points in time within the videos (one or more of which has an associated navigation graphic), and links to related videos. Other types of content may of course be displayed within display region 444 in other embodiments. As mentioned above, sidebar engine 440 may receive information from metadata processor 430 that indicates various "marked" points within video file 402. During playback, sidebar engine 440 (or processor 430) may generate navigation graphics corresponding to these marked points. Sidebar engine 440 can then display these graphics within sidebar display region 444 in some embodiments. In certain implementations of sidebar engine 440, one or more controls are usable to facilitate scrolling within display region 444—this feature is illustrated below with reference to FIG. 5.

Sidebar engine 440, in one embodiment, also receives any user input within display region 444. Such input may alter what type of content is currently being displayed within region 444, as well as within region 414. For example, if a user selects a particular navigation graphic, sidebar engine 440 passes information indicating this selection to control engine 420, which in turn causes video playback engine 410 to begin playing from the point in time during video file 402 corresponding to the selected navigation graphic.

Control bar engine 450 in one embodiment is code within video player 400 that controls the operation of control bar display region 454, which is a display region output by player 400 (this region may be distinct from video display region 414 and sidebar display region 444 in various embodiments). Control bar display region 454 will be described further below with reference to FIG. 5, and in various embodiments, may include a timeline (which may or may not have selectable visual indicia corresponding to marked points within video file 402), as well as controls to stop, play, pause, fast forward, and rewind a video file. Additionally, region 454 may include volume controls, sharing controls, zoom controls, slow motion controls, screen size controls, etc. In certain embodiments, control bar engine 450 is responsible for both the display of region 454, as well as receipt of input received through this region Like sidebar display region 444, control bar display region 454 may provide information to control video playback engine 410 (e.g., upon a user selecting a particular location along a displayed timeline).

Enhanced video engine 460 is code that controls the display of overlay graphics 464, which may include, in one embodiment, a title card, step delineation graphics, and overlays for facts, tips, warnings, etc. Other types of overlay graphics may also be used in other embodiments. As has been described, metadata 432 in one embodiment includes information indicating which (if any) overlay graphics are to be used in playing back video file 402, as well as corresponding times at which these graphics are to be displayed. (In certain embodiments, information in metadata 432 may also indicate that custom overlay graphics are to be used.) In one embodiment, metadata processor 430 communicates this information to enhanced video engine 460, which is configured to overlay any indicated graphics "on top of" the video output of video playback engine 410.

In one embodiment, video engine 460 further includes audio functionality and is configured to support the overlay of audio on top of or in place of any audio for video file 402.

Advertising control module 470 in one embodiment is code that controls the display of advertising 474 within one or more display regions output by video player 400. In one embodiment, advertising control module 470 receives information from metadata processor 430 indicating certain keywords or a description of video file 402. This information permits module 470, in one embodiment, to select appropriate advertisements to be dynamically or statically displayed within video player 400. In other embodiments, module 470 may select advertisements using criteria not based on information included within metadata 432. In certain embodiments, control module 470 may be a third-party software module. Similarly, advertisements selected by module 470 may be from a third-party site or database.

Captioning control module 480 in one embodiment is code that controls the display of captioning information 484 for video file 402. In certain embodiments, module 480 includes support for multiple languages.

Figure 5A:
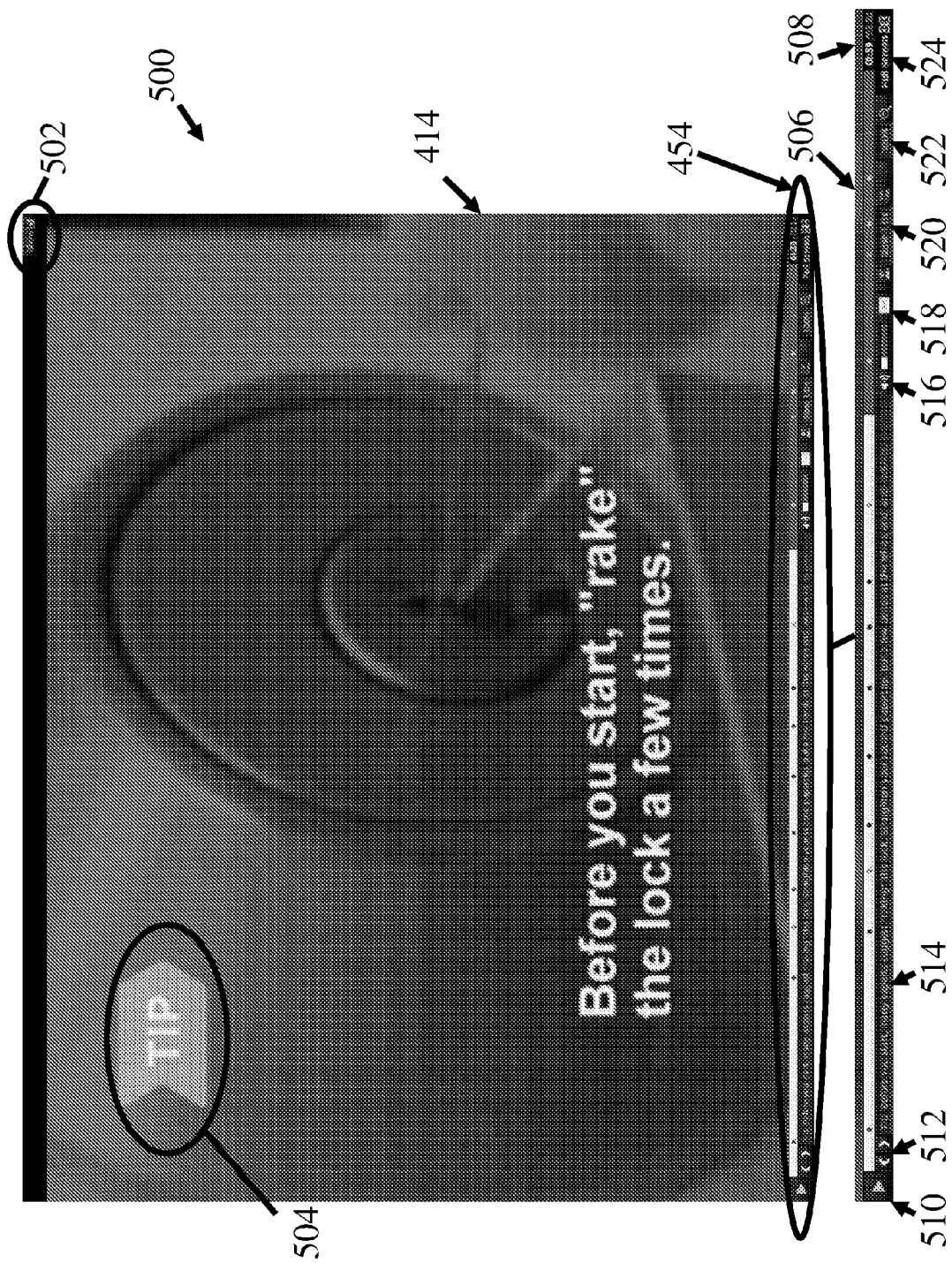
FIGS. 5A-H are screenshots illustrating sample output of embodiments of video players.

Turning now to FIG. 5A, a screenshot 500 of one embodiment of output from a video player according to the present disclosure is depicted. As shown, screenshot 500 includes video display region 414 and control bar display region 454, which is shown in enlarged view. Sidebar display region 444 is hidden in screenshot 500 by control 502, which is configured to toggle the display of region 444. (Control 502 reads "Show" when region 444 is hidden, and "Hide" when region 444 is displayed.)

In one embodiment, video display region 414 is the output of video file 402 by video playback engine 410. (Of course, a video player having the interface shown in FIG. 5A may have an internal arrangement different from the one shown in FIG. 4. The references to video player 400 and video file 402 are merely for the purpose of illustration.) As shown, video display region 414 can also include the output from other modules of video player 400. In the embodiment shown in FIG. 5A, region 414 includes an overlay graphic 504, which, along with the accompanying text shown in region 414, is the output of enhanced video engine 460 in certain embodiments. The particular type of overlay graphic is a "tip," which, in the context of an instructional video, permits text supplied during the metadata specification and editing processes (e.g., methods 200 and 220 described above) to be displayed during video playback to help explain the process depicted in the instructional video. Of course, overlay graphics are displayable in any type of video. Such graphics might display text such as lyrics in a music video, a score in a sports video, etc. Overlay graphics are described further below with reference to FIGS. 6A-D.

The embodiment of control bar display region 454 shown in FIG. 5A includes a number of features relating to video playback and distribution of video file 402. Control 510 allows a user to toggle between playing back and pausing video file 402. Control 516 permits adjusting of the volume of the audio for video file 402. Control 518 permits video file 402 to be sent or linked to a user-specified address (email or otherwise). Control 522 allows a user to control the speed at which video file 402 is played back. In one embodiment, control 522 allows video file 402 to be played back at 50% speed, 30% speed, and 10% speed. Such a control is particularly advantageous in many settings, particularly when video file 402 corresponds to an instructional video. Control 524 allows a user to toggle in and out of full-screen mode.

Control 522 in one embodiment allows a user to zoom in on a selected portion of video display region 414. In one implementation, the user is able to repeatedly select control 522 to zoom to the desired level, and then control what portion of the video is currently displayed on the screen by moving the viewing pane in a desired direction. In an alternate implementation, a user is able to select a desired portion of region 414 via a "bounding box" and then select control 522 to zoom in on display region 414 to the desired degree. Control 522 is also selectable to zoom out with respect to display region 414.

As shown, display region 454 includes a timeline display region 506. In this embodiment, region 506 includes a timeline that visually indicates the current location within video file 402. (Elapsed time indication 508 also provides this information.) The timeline in region 506 includes dots within the timeline (one example of visual indicia) that correspond, in one embodiment, to points in the video file that have been marked by the user in metadata files 432. Control bar region 454 allows a user to select any of these dots in order to navigate to that point in the video file. In certain embodiments, passing the cursor over the displayed dots (e.g., "mousing over") causes textual information associated with the marked point in time to be displayed—e.g., in a text balloon. For example, mousing over a dot within the timeline of region 506 might display the text of a tip or the name of a step in the video.

In one embodiment, control 512 allows a user to advance forward and backward between the points in time corresponding to the visual indicia shown in the timeline in region 506. For example, control 512 may allow a user to advance from the middle of step 1 to the beginning of step 2 in the context of an instructional video. Similarly, display region 514 in one embodiment outputs text corresponding to the current point in time in the video file. For example, in FIG. 5A, display region 514 includes an expanded version of the "tip" text displayed in region 414. In other embodiments, display region 514 could display data determined during video playback (such data might be different during each playback of a given video file).

Figure 5B:
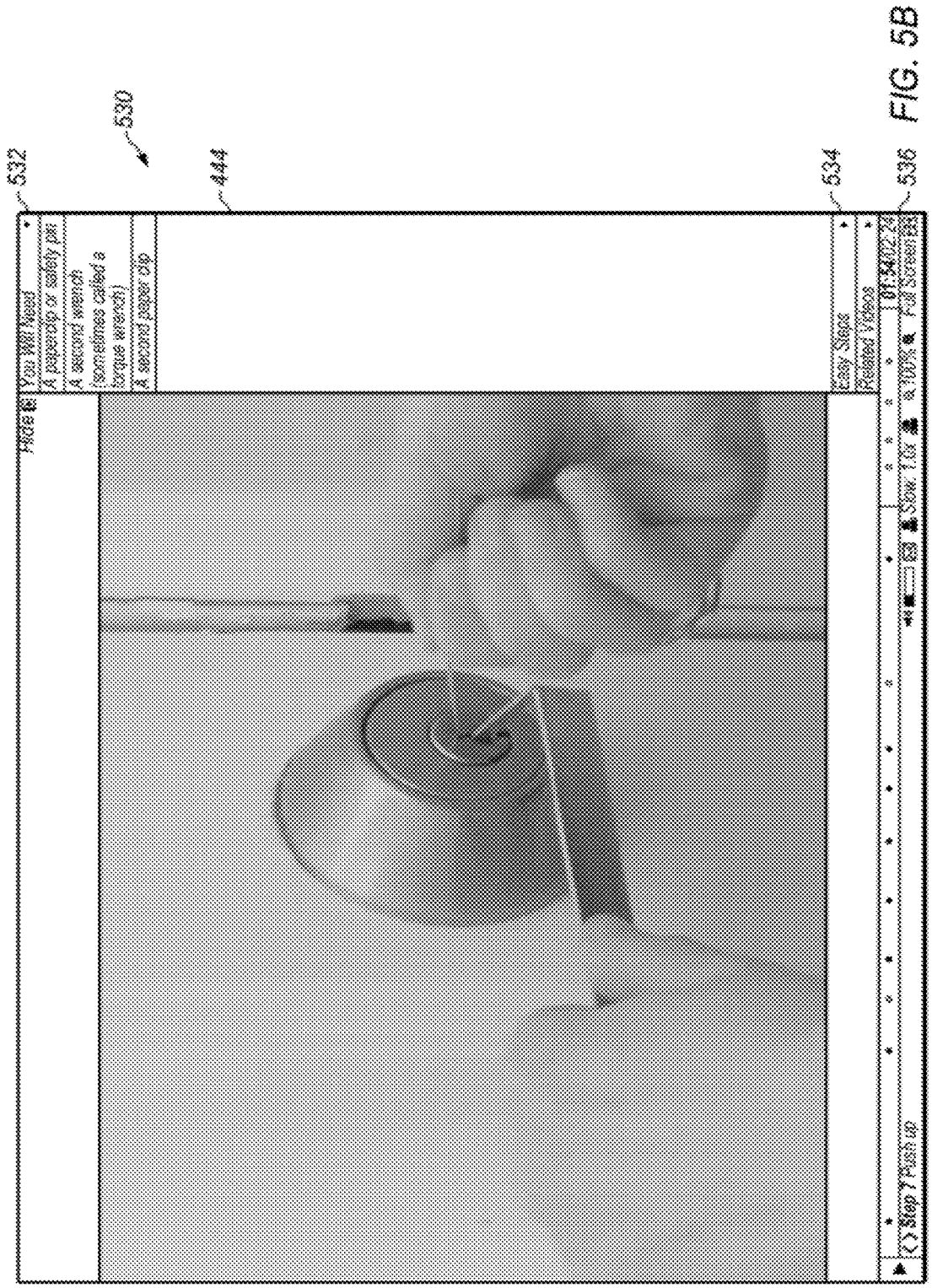

Turning now to FIG. 5B, a screenshot 530 of output from one embodiment of a video player 400 according to the present disclosure is depicted. Screenshot 530 shows sidebar display region 444, which was hidden in FIG. 5A. (Note that control 502, not labeled in FIG. 5B, reads "Hide" rather than "Show").

In the embodiment shown, region 444 includes three areas: "You Will Need" (needed items) area 532, "Easy Steps" (steps) area 534, and related videos area 536. These three areas are particularly suited for display in conjunction with an instructional video. In other embodiments, the contents of sidebar display region 444 may be different.

In the embodiment shown, needed items area 532 lists one or more items used for performing the process depicted by video file 402. In one embodiment, this list of items resides in metadata 432 and is accessed by metadata processor 430. Accordingly, the metadata corresponding to the needed items may be changed by the owner of the video file as desired. In certain embodiments, area 532 includes purchase links for one or more of the listed items. Variations of purchase links are described further with reference to FIG. 5C.

In one embodiment, the list of needed items may dynamically change during playback of the video file (for example, the list of needed items may correspond to the currently active step). In such an embodiment, metadata processor 430 accesses metadata 432 to retrieve the current data to be displayed in area 532.

In the embodiment shown, steps area 534 includes one or more navigation graphics, each of which is user-selectable to navigate to a particular point in time in the video. In the context of an instructional video, navigation graphics may correspond to steps in the depicted process, as well as other points in time at which it is appropriate to call the viewer's attention to particular subject matter (e.g., facts, tips, warnings, etc.). In certain embodiments, the set of currently displayed navigations graphics changes during video playback. For example, in one embodiment, the current step, etc. is displayed in the middle of area 534. (Note: In the embodiment shown, area 534 expands when active. Area 534 is not active in FIG. 5B.) In some embodiments, area 534 includes a user-selectable control (e.g., up and down arrows) to allow scrolling within steps independent of the current state of playback of video file 402. In certain embodiments, navigation graphics in area 534 include graphics and text relating to the portion of the video with which they are associated. Area 534 is also discussed with reference to FIGS. 5D and 5E. Navigation graphics are of course possible in types of videos other than instructional videos.

Related videos area 536, when active, displays graphics (e.g., thumbnails) corresponding to videos that are deemed to be related to the current video based on some predetermined criteria. For example, videos having representative graphics in area 536 might be classified in the same category as the current video. Alternately, videos depicted in area 536 might share certain keywords with the current video. Area 536 is also discussed with reference to FIG. 5F.

Figure 5C:
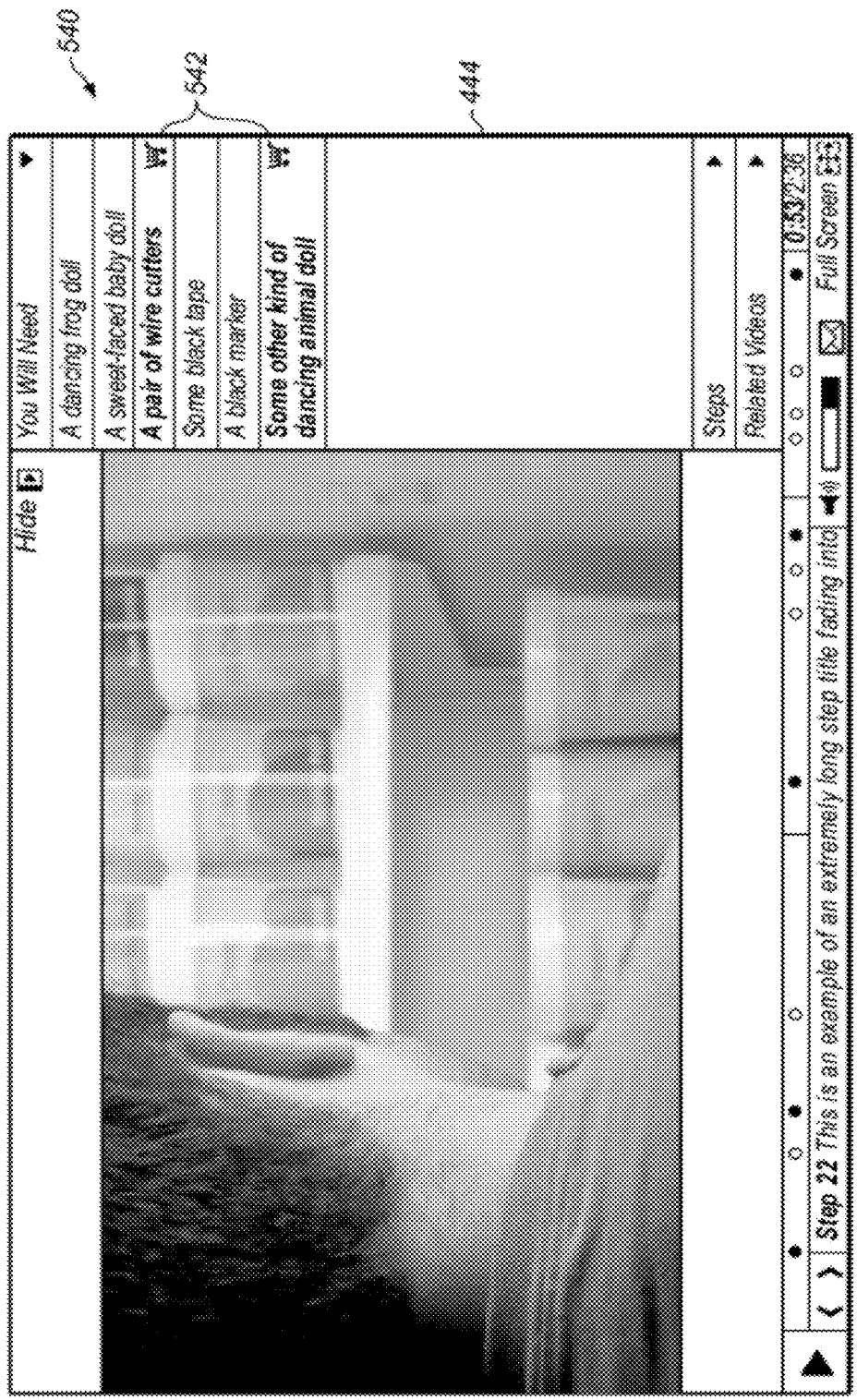

Turning now to FIG. 5C, a screenshot 540 is shown that depicts a video player having a sidebar display region 444. As shown, region 444 shown in screenshot 540 includes needed items area 532, steps area 534, and related videos 536 (these areas are not labeled in FIG. 5C for convenience). Area 532 is currently expanded, and displays a list of six needed items. Two of these items are highlighted and have shopping cart icons 542 next to them. These icons 542 are "purchase links," and are user-selectable in various embodiments to facilitate the purchase, lease, temporary use, etc. of the associated item via some location (e.g., a web page).

In one embodiment, a purchase link may simply be a hyperlink that causes a different page (e.g., web page) of electronic content to be displayed to the user. In other embodiments, a purchase link may cause an executable to run to facilitate a purchase. Various embodiments of purchase links are thus possible.

In one embodiment, the purchase link facilitates purchase of the associated item at a location (e.g., a web page) that is stored in metadata 432. Accordingly, a video owner/creator might supply a link to a website where a particular item may be purchased. In another embodiment, the location associated with a particular purchase link may be determined dynamically. As one example, sidebar engine 440 might access a third-party site to determine, during or before playback, an appropriate location to associate with a particular purchase link for a particular item. The appropriate location, in some instances, might correspond to a third party that has placed the highest current bid for the right to display that link. In such embodiments, the same purchase link icon might point to different locations at different points in time.

Figure 5D:
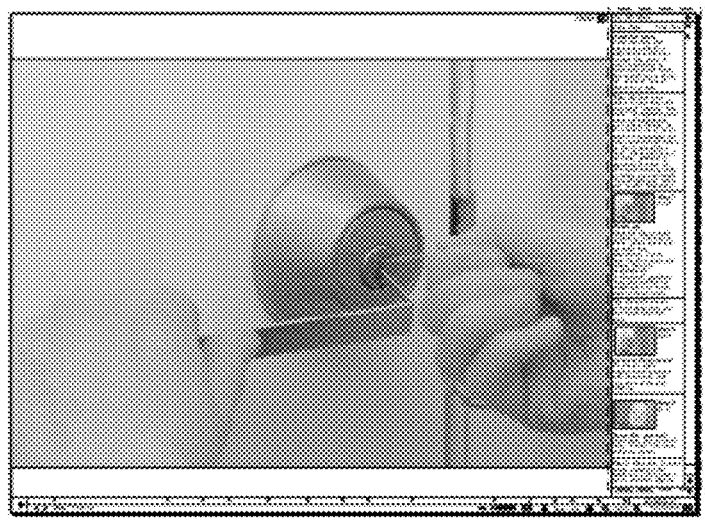
Figure 5E:
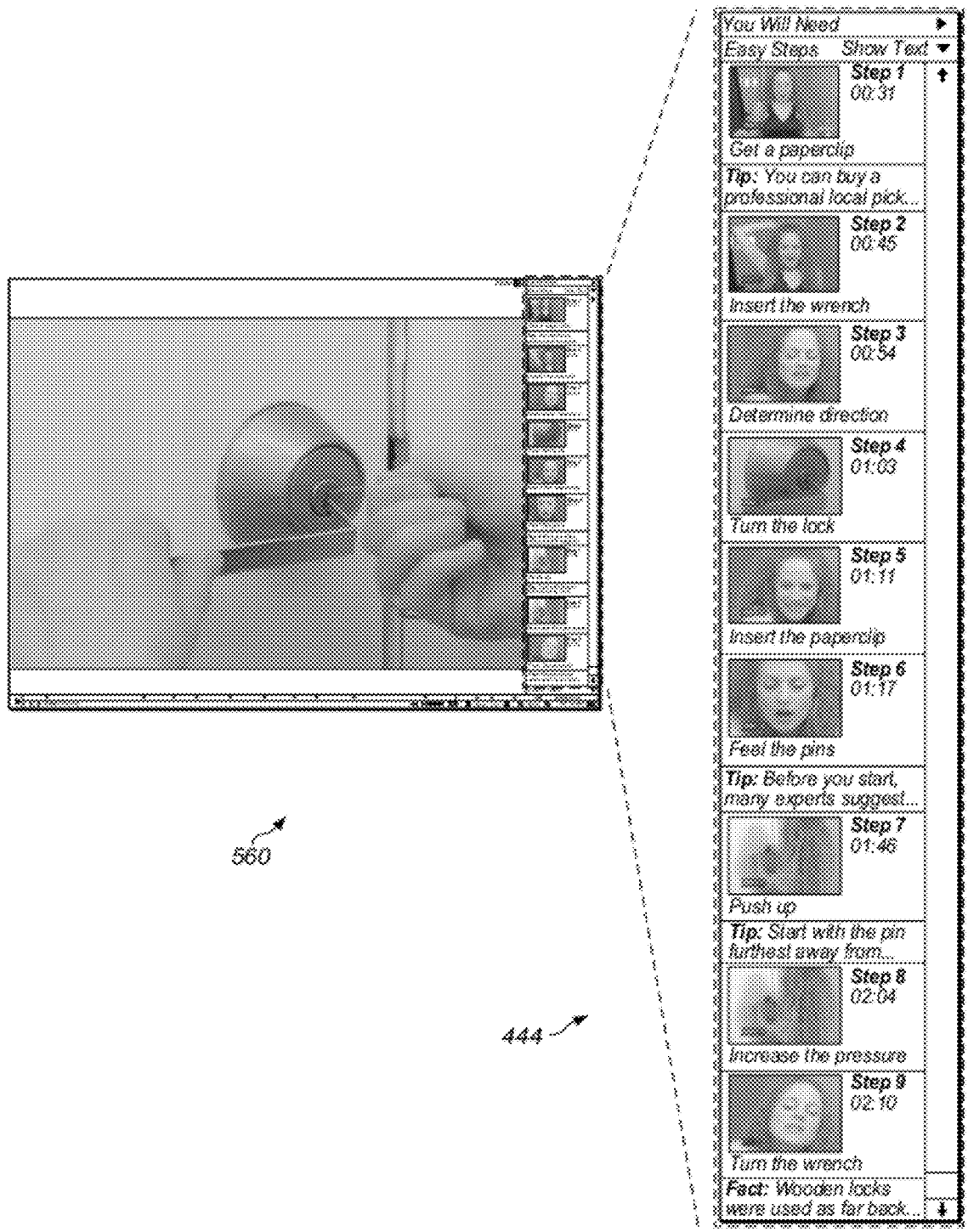

Turning now to FIGS. 5D and 5E, two different screenshots (550 and 560) of steps area 534 within sidebar display region 444 of video player 400 are shown. The steps area 534 in each Figure includes a number of navigation graphics, each of which corresponds to a particular point in time in the associated video file. Some of the navigation graphics shown in FIGS. 5D and 5E include only text, while some include text, an image, and a time value indicating its relative location within the video file. Also note that area 534 includes a scroll bar, permitting traversal of all points in time identified in metadata 432. In the embodiment shown, each of the navigation graphics depicted can be selected by the user in order to immediately skip to that point in the video. In other embodiments, steps area 534 can include non-selectable content or content that has other functionality.

FIG. 5D depicts output of an embodiment of video player 400 in which a "Show Text" option within area 534 has been selected, while FIG. 5E depicts output of player 400 in which a "Hide Text" option has been selected. The primary difference between the two options is that in the "Show Text" mode shown in FIG. 5D, more text is displayed within a given navigation graphic. The "Hide Text" mode shown in FIG. 5E thus permits the display of more navigation graphics within area 534 of region 444.

Figure 5F:
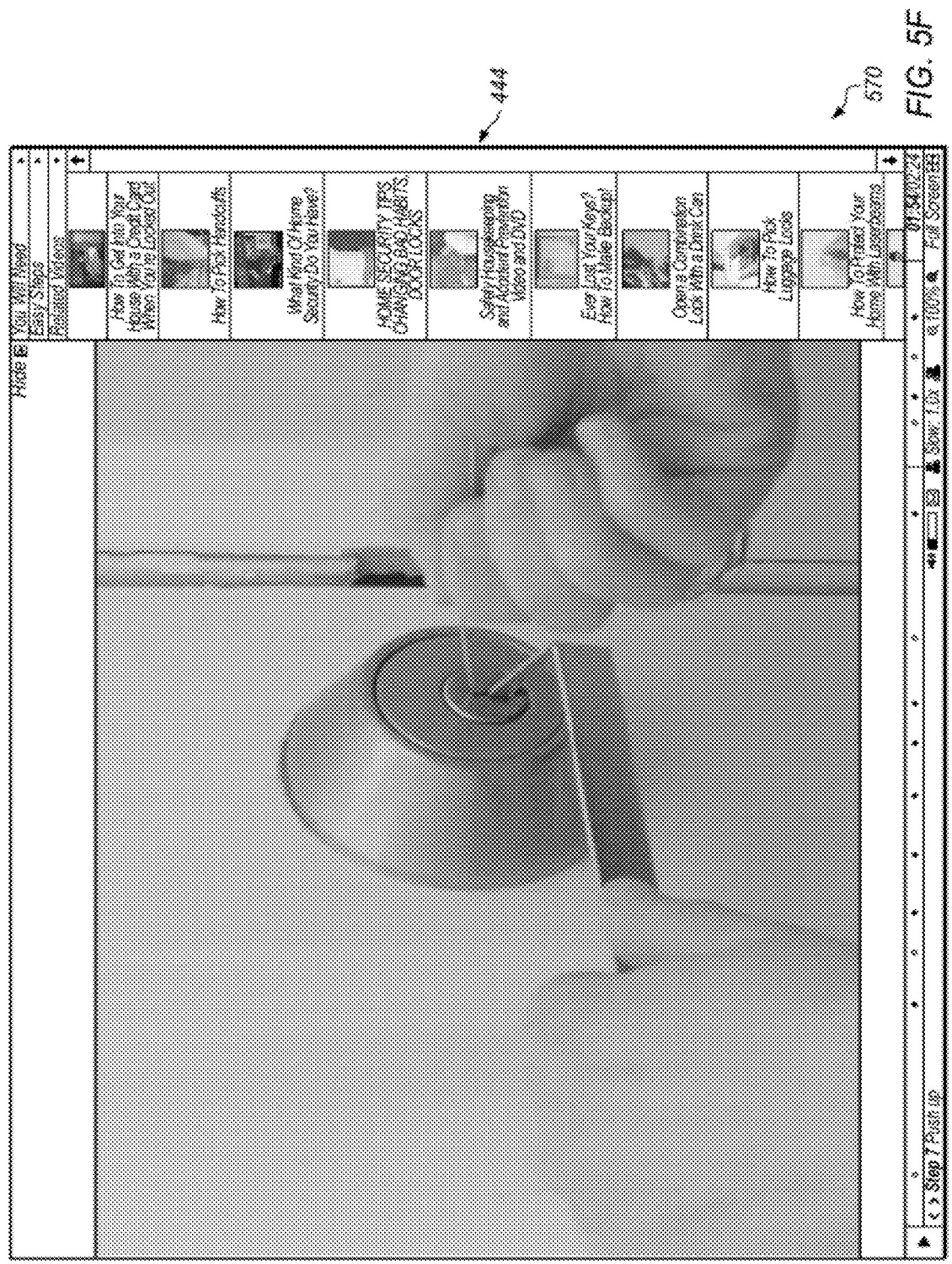

Turning now to FIG. 5F, a screenshot 570 is depicted in which the "Related Videos" tab 536 is active. This feature allows a user to be exposed to videos that he or she may be interested in based on the current video, user preferences, etc. This information may be dynamically determined by sidebar engine 440 during playback in some embodiments.

Figure 5G:
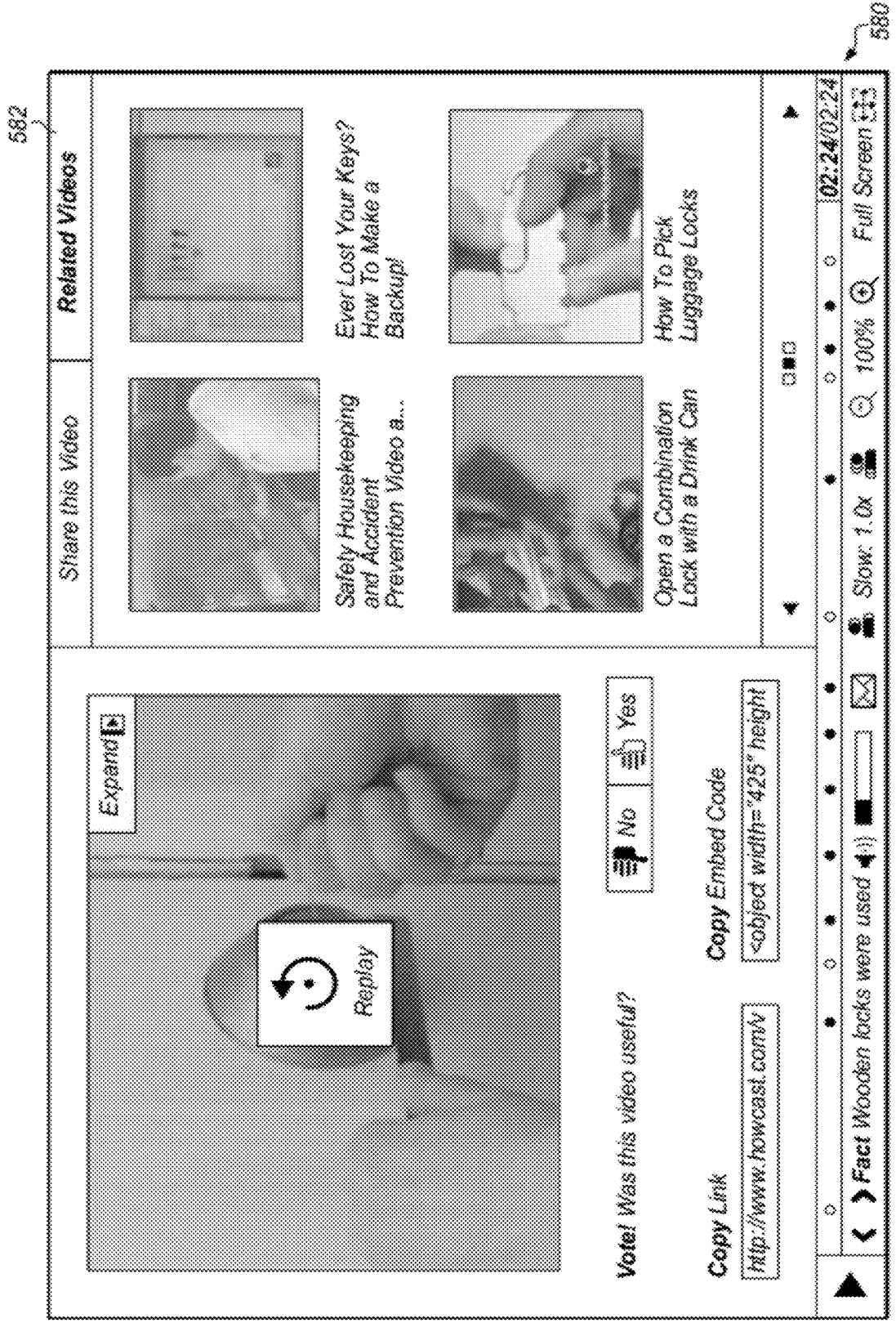
Figure 5H:
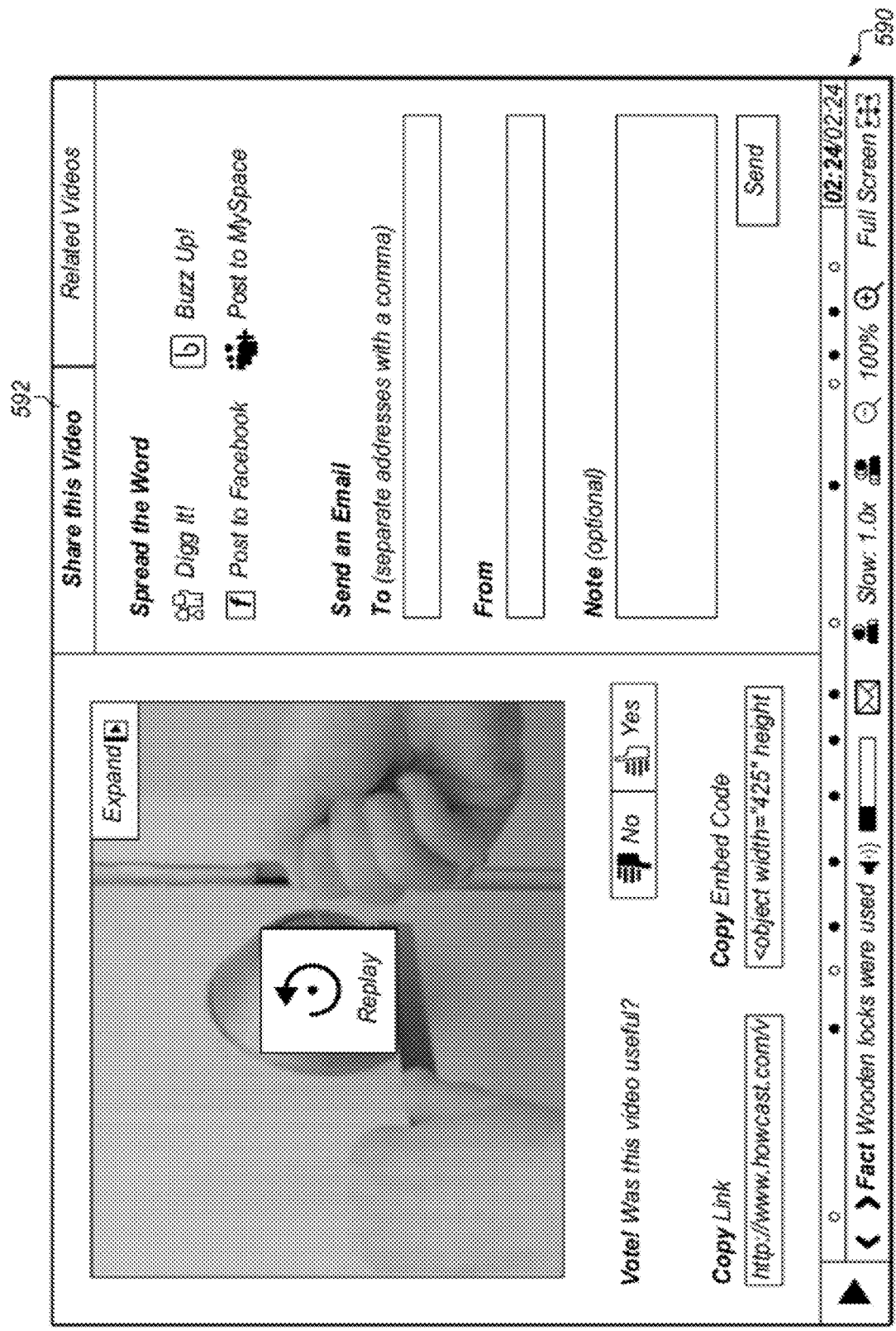

Turning now to FIGS. 5G and 5H, screenshots 580 and 590 are shown of video player 400 upon completion of playback of video file 402. Screenshot 580 in FIG. 5G depicts the selection of the "Related Videos" tab 582, while screenshot 590 in FIG. 5H depicts the selection of the "Share this Video" tab 592. Tab 592 permits a user to post a link to or embed the video in various websites and/or send a link to a user at a specified address such as an email address.

Figure 6A:
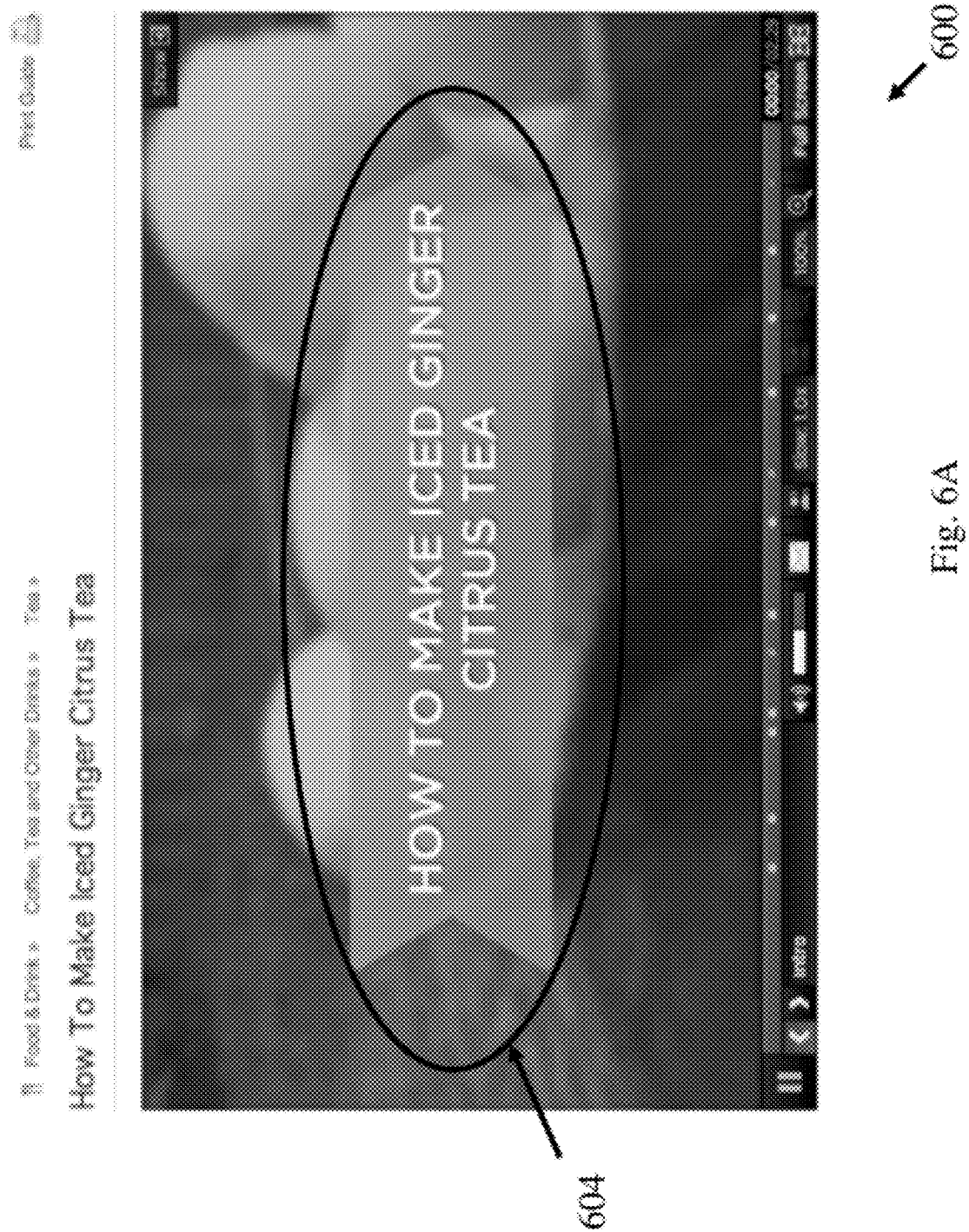
FIGS. 6A-D are screenshots illustrating overlay graphics output by embodiments of video players.
Figure 6B:

Turning now to FIG. 6A, a screenshot 600 illustrating the use of a title card overlay graphic 604 is shown. As has been described above, in one embodiment, the metadata upload/editing processes (e.g., methods 200, 220) permit a user to specify whether overlay graphics are to be used during playback of the video file. Such overlay graphics are advantageous because they permit the creator/owner of a video to have them appear with a minimum of effort on their part.

Consider the example shown in FIG. 6A. In this embodiment, all a user needs to do to have this title card appear is to specify that title overlay graphics are desired, and to provide the desired video title to be included in the title overlay graphic. In one embodiment, during playback, enhanced video engine 460 determines, from metadata processor 430, that title overlay graphics have been selected, and that a certain title has been supplied. In one embodiment, engine 460 combines the supplied title with a default graphic such as the "chevron" symbol shown in FIG. 6A to produce an overlay graphic. In one particular implementation, the overlay graphic may be accompanied by some predetermined audio clip that is overlaid (e.g., a chime sound). As has been described, in some embodiments, a video owner may opt to supply not only the text for an overlay graphic, but the actual graphic itself. The use of such custom graphics may be handled by engine 460 in one embodiment.

Figure 6C:
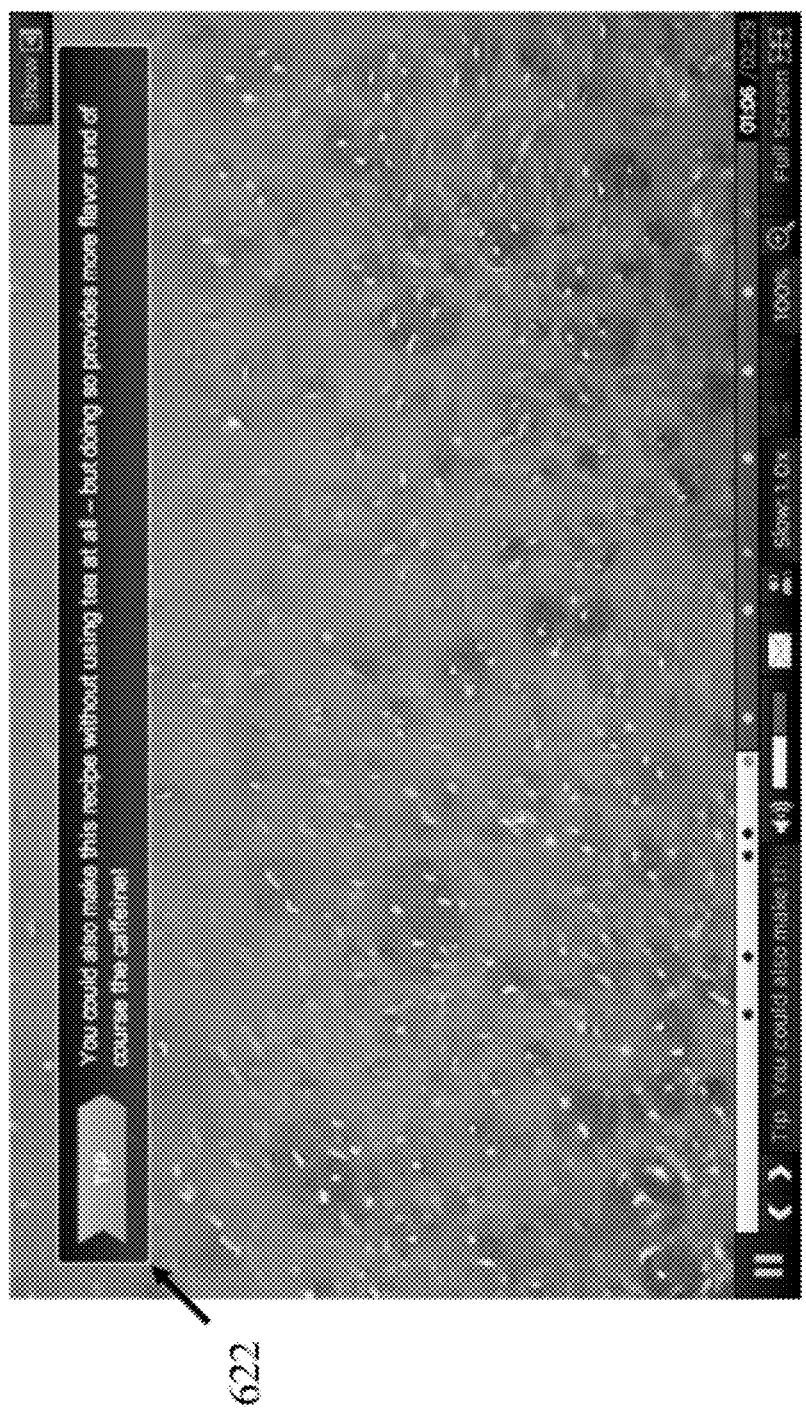
Figure 6D:

Turning now to FIGS. 6B-6D, screenshots 610, 620, and 630 illustrating different types of overlay graphics are shown. FIG. 6B illustrates an overlay graphic 612 that delineates the start of a step in an instructional video, while FIGS. 6C and 6D illustrate overlay graphics 622 and 632 corresponding to a "tip" and a "fact," respectively. In some embodiments, overlay graphics are used to depict a "warning" regarding a particular process. Note that "tip," "fact," and "warning" are merely exemplary kinds of content, and overlay graphics are possible to represent a wide variety of content types.

In one embodiment, an underlying video file may be edited so that it includes overlay graphics and/or audio. In one implementation, this process may be initiated, for example, when metadata for a particular video file is received initially (e.g., method 200) or when it is updated (e.g., method 220). First, a video owner/creator may specify (e.g., to server system 10) that the video file is to be altered to include overlay graphics and/or audio. This specification may include the graphic(s) to be used, the placement of graphics on the screen, the time in the video file at which the graphics are to be overlaid, any associated audio, etc. With the video file to be edited already uploaded, this process may next include deconstructing the first portion of the video file to be altered into individual frames (video is commonly shot at a rate such as 24 frames/second). This deconstruction may be performed using known means such as rotoscoping. Next, each frame in the first portion of the video file may be manipulated to include the desired graphical content. This manipulation may be done automatically (e.g., by server system 10 based on user specifications) or manually (e.g., within the context of a browser on system 30 using an editing tool (software including program instructions executable by system 30) provided by server system 10 that has the ability to add graphics to individual frames of video). When editing of the frames in the first portion of video is complete, any remaining portions of the video file to be altered are edited in the same fashion. Finally, the altered frames are reassembled to create an altered video file. The alteration of a video file in this manner allows such a video file to be played on an arbitrary player or device, yet have a similar appearance as if played on a video player with an enhanced video engine (e.g., 460) configured to display overlay graphics specified through metadata. Audio may be overlaid on the relevant portions of the video file as well.

Similarly, an overlay animation could be edited into a video file by deconstructing the desired animation into a set of frames and then aligning those frames on top of the set of video frames to be altered.

Articles of manufacture that store instructions (and, optionally, data) executable by a computer system to implement various techniques disclosed herein are also contemplated. These articles of manufacture include tangible computer-readable memory media. The contemplated tangible computer-readable memory media include portions of the memory subsystem of computer system 100 (without limitation SDRAM, DDR SDRAM, RDRAM, SRAM, flash memory, and various types of ROM, etc.), as well as storage media or memory media such as magnetic (e.g., disk) or optical media (e.g., CD, DVD, and related technologies, etc.). The tangible computer-readable memory media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. One or more non-transitory computer-readable memory media storing program instructions executable on a server system to:
   receive, from a first client computer system, a video file;
   provide information to the first client computer system that permits a user of the first client computer system to designate, during playback, at least two points in time within the video file for which a respective navigation graphic is to be displayed during subsequent playback of the video file, wherein designation of each of the at least two points in time pauses playback of the video file to permit additional user input relating to that corresponding point in time;
   receive information from the first client computer system, wherein the received information is indicative of the at least two points in time and corresponding additional user input;
   store the received information as metadata for the video file in one or more metadata files distinct from the video file;
   receive, from a second client computer system, a request to play the video file;
   in response to the request, provide the video file to the second client computer system, wherein the second client computer system includes program instructions executable to implement a video player that is configured to:
      access the stored metadata; and
      during playback of the video file, display navigation graphics corresponding to the at least two points in time specified by the accessed metadata, wherein each of the displayed navigation graphics is selectable by a user of the second client computer system to navigate within the video file to its corresponding point in time; and
   receive, from a third client computer system, a request to edit the stored metadata for the video file, wherein the request includes metadata changing one or more of the at least two points in time previously stored within the one or more metadata files, and wherein the request does not include re-uploading the video file to the server system;
   update the stored metadata in the one or more metadata files according to the request, wherein updating the stored metadata causes subsequent playback of the video file using the video player to display updated navigation graphics, including navigation graphics corresponding to the one or more changed points in time.

2. The non-transitory computer-readable memory media of claim 1, wherein the information provided to the first client computer system that permits the user of the first client computer system to designate the at least two points in time includes instructions executable to:
   send information to the server system that identifies a first point in time and additional user input corresponding to the first point in time, wherein the sent information is storable by the server system as metadata usable to display a navigation graphic corresponding to the first point in time during subsequent playback of the video file by a client computer system; and
   resume playback of the video file to permit designation of additional points in time within the video file.

3. The non-transitory computer-readable memory media of claim 1, wherein the video player is configured to display the navigation graphics in a display region separate from a display region for the video file, wherein the separate display region permits scrolling within navigation graphics in the separate display region without affecting the display of the video file.

4. The non-transitory computer-readable memory media of claim 1, further storing program instructions executable on the server system to:
   provide information to the first client computer system, including program instructions executable on the first client computer system to display a timeline including visual indicia of the at least two designated points in time.

5. The non-transitory computer-readable memory media of claim 4, further storing program instructions executable on the server system to:
   provide information to the first client computer system, including instructions executable on the first client computer system to permit moving one or more of the visual indicia along the timeline in response to user input, thus causing a change in the identification of one or more of the at least two designated points in time and a change in the navigation graphics that are displayed during subsequent playback of the video file.

6. The non-transitory computer-readable memory media of claim 2, wherein the video file depicts a process having two or more steps, including a first step that begins at the first point in time within the video file, and wherein the additional user input for the first point in time includes information identifying a title or a description of the first step.

7. A method, comprising:
   a server computer system receiving, from a first client computer system, a first upload of a video file;
   the server computer system providing information to the first client computer system that permits a user of the first client computer system to designate, during playback of the first uploaded video file, at least two points in time within the first uploaded video file for which a respective navigation graphic is to be displayed during subsequent playback of the first uploaded video file and to enter additional user input descriptive of each of the at least two points in time during corresponding pauses in playback;

the server computer system receiving marking information from the first client computer system, wherein the received marking information is indicative of the user-designated points in time;

the server computer system storing the received marking information as metadata for the first uploaded video file in one or more metadata files distinct from the first uploaded video file;

the server computer system receiving, from a second client computer system, a request to play the first uploaded video file;

in response to the request, the server computer system transmitting the first uploaded video file to the second client computer system for playback by a video player that includes program instructions executable to:
access the stored metadata; and
display navigation graphics corresponding to the at least two points in time specified by the accessed metadata, wherein each of the displayed navigation graphics is selectable by a user of the second client computer system to navigate within the first uploaded video file to its corresponding point in time; and the server computer system receiving, from a third client computer system, updated metadata for the first uploaded video file, including updated metadata changing one or more of the at least two points in time previously designated within the first uploaded video file;

wherein the updated metadata causes subsequent playback of the first uploaded video file to display navigation graphics corresponding to the one or more changed points in time without a second upload of the video file subsequent to the first upload.

8. The method of claim 7, wherein the information provided to the first client computer system permits:
playing back the video file at the first client computer system;
during playback of the video file, receiving user input at a first point in time within the video file;
responsive to the user input, pausing playback of the video file at the first point in time;
while playback is paused, receiving additional user input descriptive of the first point in time; and
storing information that identifies the first point in time and includes the additional user input, wherein the stored information includes metadata usable to display a navigation graphic corresponding to the first point in time during subsequent playback of the video file by a client computer system.

9. The method of claim 8, wherein the information provided to the first client computer system further permits:
resuming playback of the video file to permit designation of additional points in time within the video file.

10. The method of claim 8, wherein the video file depicts a process having two or more steps, including a first step that begins at the first point in time within the video file, and wherein the additional user input for the first point in time includes information identifying a title or description of the first step.

11. The method of claim 7, wherein the video player is executable to display the navigation graphics in a display region separate from a display region for the video file, wherein the video player is executable to permit scrolling within navigation graphics in the separate display region without affecting the display of the video file during playback.

12. The method of claim 7, further comprising:
providing information to the first client computer system to cause display of a timeline including visual indicia of the at least two designated points in time.

13. The method of claim 7, further comprising:
providing information to the first client computer system to permit moving one or more of the visual indicia along the timeline in response to user input, thus causing a change in the identification of one or more of the at least two designated points in time and a change in the navigation graphics that are displayed during subsequent playback of the video file.

14. A method, comprising:
a first computer system receiving a first upload of a video file;
the first computer system storing a set of metadata associated with the video file in one or more metadata files distinct from the video file, wherein the stored set of metadata includes marking information indicating at least two different user-designated points in time within the video file, wherein the first computer system is configured to provide the first uploaded video file for playback at a remote computer system, wherein playback is performed via a video player that accesses the one or more metadata files to display navigation graphics corresponding to the at least two points in time, wherein the displayed navigation graphics are each selectable via the video player to navigate within the video file to the corresponding point in time;
the first computer system receiving, from a second computer system, updated metadata for the video file, wherein the updated metadata changes one or more of the at least two points in time;
the first computer system storing the updated metadata in the one or more metadata files;
the first computer system subsequently receiving a request to play the video file on a third computer system; and
the first computer system providing the first uploaded video file and the updated metadata for playback on the third computer system via the video player such that updated navigation graphics are displayed corresponding to the one or more changed points in time, wherein display of the updated navigation graphics is performed without the first computer system receiving a second upload of the video file subsequent to the first upload.

* * * * *